United States Patent
Mochizuki et al.

(10) Patent No.: US 9,248,668 B2
(45) Date of Patent: Feb. 2, 2016

(54) INKJET RECORDING APPARATUS AND INKJET RECORDING METHOD

(71) Applicant: FUJIFILM Corporation, Tokyo (JP)

(72) Inventors: Kyohei Mochizuki, Ashigarakami-gun (JP); Yasuhiko Kachi, Ashigarakami-gun (JP); Kazuo Sanada, Ashigarakami-gun (JP); Hirofumi Saita, Ashigarakami-gun (JP); Kazuaki Okamori, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/695,393

(22) Filed: Apr. 24, 2015

(65) Prior Publication Data

US 2015/0231892 A1    Aug. 20, 2015

Related U.S. Application Data

(63) Continuation of application No. PCT/JP2013/077051, filed on Oct. 4, 2013.

(30) Foreign Application Priority Data

Oct. 25, 2012    (JP) ................. 2012-235712

(51) Int. Cl.
| | | |
|---|---|---|
| *B41J 2/01* | (2006.01) | |
| *B41J 11/00* | (2006.01) | |
| *B41J 2/21* | (2006.01) | |
| *B41J 2/15* | (2006.01) | |

(52) U.S. Cl.
CPC ........ *B41J 11/002* (2013.01); *B41J 2/15* (2013.01); *B41J 2/2107* (2013.01)

(58) Field of Classification Search
CPC ........... B41J 11/002; B41J 2/15; B41J 2/2107
See application file for complete search history.

(56) References Cited

U.S. PATENT DOCUMENTS

| | | | |
|---|---|---|---|
| 8,664,291 B2 | 3/2014 | Kida et al. | |
| 2010/0120939 A1* | 5/2010 | Phelan | ............ C08F 230/08 523/107 |
| 2014/0128496 A1 | 5/2014 | Kida et al. | |

FOREIGN PATENT DOCUMENTS

JP    2012-092291 A    5/2012

OTHER PUBLICATIONS

International Search Report; PCT/JP2013/077051; Nov. 5, 2013.
Written Opinion of the International Searching Authority; PCT/JP2013/077051; Nov. 5, 2013.

* cited by examiner

*Primary Examiner* — Julian Huffman
(74) *Attorney, Agent, or Firm* — Studebaker & Brackett PC

(57) ABSTRACT

An inkjet recording apparatus for forming an image by discharging an ink including an ink pigment and a polymerizable compound containing at least an N-vinyl lactam, in which the 90% diameter in cumulative volume distribution of the particle diameters of the ink pigment is equal to or less than 500 nm and the content of N-vinyl lactam is 3% to 24%, from nozzles of an inkjet head, which includes nozzle arrays having nozzles each of which discharges a curable ink cured by applied active energy and which are arranged in the first direction at a pitch P, the nozzle arrays being N (N≥4) nozzle arrays of every color, which respectively discharge thick inks of at least four colors and which nozzle arrays are arranged to be shifted by P/N away from each other in the first direction.

20 Claims, 19 Drawing Sheets

FIG. 6A

| 10 | 5 |
|----|---|
| 9  | 4 |
| 8  | 3 |
| 7  | 2 |
| 6  | 1 |

FIG. 6B

| 8  | 3 |
|----|---|
| 10 | 5 |
| 7  | 2 |
| 9  | 4 |
| 6  | 1 |

FIG. 6C

| 10 | 5 |
|----|---|
| 4  | 9 |
| 8  | 3 |
| 2  | 7 |
| 6  | 1 |

FIG. 12

| | | | Y | M | C | K | LM | LC |
|---|---|---|---|---|---|---|---|---|
| MILL BASE | PIGMENT | INKJET YELLOW 4GC | 2.170 | | | | | |
| | | CINQUASIA MAGENTA RT-355-D | | 4.920 | | | | |
| | | IRGALITE BLUE GLVO | | | 2.595 | | 0.975 | 0.339 |
| | | SPECIAL BLACK 250 | | | | 3.220 | | |
| | SOLVENT | NPGPODA | | 9.610 | 5.104 | 3.945 | 1.905 | 0.667 |
| | | PEA | 3.725 | | | | | |
| | DISEPRSANT | SOLSPERSE 32000 | 0.435 | 1.706 | 0.865 | 0.805 | 0.338 | 0.113 |
| | POLYMERIZATION INHIBITOR | FIRSTCURE ST-1 | 0.070 | 0.164 | 0.087 | 0.081 | 0.033 | 0.011 |
| | Child | | SM828 | SM925 | SM988 | SM800 | SM925 | SM988 |
| | TOTAL | | 6.400 | 16.400 | 8.650 | 8.050 | 3.250 | 1.130 |

FIG. 13

| | | EXAMPLE 1 | | | | | | EXAMPLE 2 | | | | | |
|---|---|---|---|---|---|---|---|---|---|---|---|---|---|
| | | Y | M | C | K | LM | LC | Y | M | C | K | LM | LC |
| | NVC | 24 | 24 | 24 | 23 | 24 | 24 | 24 | 24 | 24 | 23 | 24 | 24 |
| | PEA | | | | | | | | | | | | |
| MONOMER | EOTMPTA | 5.3 | 1 | 3.75 | 3.4 | 5.55 | 8.17 | 5.3 | 1 | 3.75 | 3.4 | 5.55 | 8.17 |
| | CTFA | 53 | 51 | 52 | 51 | 54.5 | 54 | 53 | 51 | 52 | 51 | 54.5 | 54 |
| | IBOA | | | | | | | | | | | | |
| | DPGDA | | | | | | | | | | | | |
| | IRGACURE 819 | 3 | 2.8 | 2.8 | 5 | 2.8 | 2.8 | 3 | 2.8 | 2.8 | 5 | 2.8 | 2.8 |
| | DAROCURE TPO | 2.8 | 2.8 | 2.8 | 2.8 | 2.9 | 2.9 | 2.8 | 2.8 | 2.8 | 2.8 | 2.9 | 2.9 |
| POLYMERIZATION | IRGACURE 184 | | | | | 1.6 | 1.6 | | | | | 1.6 | 1.6 |
| INHIBITOR | ITX | 3 | 2 | 2 | 3 | 0.4 | 0.4 | 3 | 2 | 2 | 3 | 0.4 | 0.4 |
| | DETX | | | | | | | | | | | | |
| MILL BASE | | 6.4 | 16.4 | 8.65 | 8.05 | 3.25 | 1.13 | 6.4 | 16.4 | 8.65 | 8.05 | 3.25 | 1.13 |
| OLIGOMER | CN964 A85 | 2.5 | | 4 | 3.75 | 5 | 5 | 2.5 | | 4 | 3.75 | 5 | 5 |
| TOTAL | | 100.00 | 100.00 | 100.00 | 100.00 | 100.00 | 100.00 | 100.00 | 100.00 | 100.00 | 100.00 | 100.00 | 100.00 |
| MILLING TIME AT A TIME OF PIGMENT FORMATION (hr) | | 4 | 4 | 4 | 4 | 4 | 4 | 3 | 3 | 3 | 3 | 3 | 3 |
| REDISPERSION TIME AT A TIME OF INK FORMATION (hr) | | 0.5 | 0.5 | 0.5 | 0.5 | 0.5 | 0.5 | 0.5 | 0.5 | 0.5 | 0.5 | 0.5 | 0.5 |
| PARTICLE DIAMETER | (average) (nm) | 250 | 240 | 250 | 254 | 236 | 254 | 270 | 250 | 255 | 260 | 245 | 270 |
| | (DV90) (nm) | 300 | 354 | 312 | 378 | 215 | 298 | 450 | 472 | 472 | 421 | 413 | 485 |
| SHUTTLE SCANNING SPEED (m/sec) | | | | 1.2 | | | | | | 1.2 | | | |
| HEAD SHIFT | | | | PRESENT | | | | | | PRESENT | | | |
| EFFECT | GLOSS UNEVENNESS | | | 5 | | | | | | 4 | | | |
| | STICKINESS | | | 5 | | | | | | 5 | | | |
| | FLEXIBILITY | | | 3 | | | | | | 3 | | | |
| | PRODUCTIVITY | | | 5 | | | | | | 5 | | | |

FIG. 14

| | | EXAMPLE 3 | | | | EXAMPLE 4 | | | | | |
|---|---|---|---|---|---|---|---|---|---|---|---|
| | | Y | M | C | K | LM | LC | Y | M | C | K | LM | LC |
| MONOMER | NVC | 24 | 24 | 24 | 23 | 24 | 24 | 14 | 14 | 14.2 | 14 | 14.5 | 14.5 |
| | PEA | | | | | | | 30 | 30 | 30 | 30 | 30 | 30 |
| | EOTMPTA | 5.3 | 1 | 3.75 | 3.4 | 5.55 | 8.17 | 14.3 | 8 | 11.55 | 9.4 | 15.55 | 17.67 |
| | CTFA | 53 | 51 | 52 | 51 | 54.5 | 54 | | | | | | |
| | IBOA | | | | | | | 14 | 14 | 14 | 14 | 14 | 14 |
| | DPGDA | | | | | | | 10 | 10 | 10 | 10 | 10 | 10 |
| POLYMERIZATION INHIBITOR | IRGACURE 819 | 3 | 2.8 | 2.8 | 5 | 2.8 | 2.8 | 3 | 2.8 | 2.8 | 5 | 2.8 | 2.8 |
| | DAROCURE TPO | 2.8 | 2.8 | 2.8 | 2.8 | 2.9 | 2.9 | 2.8 | 2.8 | 2.8 | 2.8 | 2.9 | 2.9 |
| | IRGACURE 184 | | | | | 1.6 | 1.6 | | | | | 1.6 | 1.6 |
| | ITX | 3 | 2 | 2 | 3 | 0.4 | 0.4 | 3 | 2 | 2 | 3 | 0.4 | 0.4 |
| | DETX | | | | | 0.4 | 0.4 | 3 | 2 | 2 | 3 | 0.4 | 0.4 |
| MILL BASE | | 6.4 | 16.4 | 8.65 | 8.05 | 3.25 | 1.13 | 6.4 | 16.4 | 8.65 | 8.05 | 3.25 | 1.13 |
| OLIGOMER | CN964 A85 | 2.5 | | 4 | 3.75 | 5 | 5 | 2.5 | | 4 | 3.75 | 5 | 5 |
| TOTAL | | 100.00 | 100.00 | 100.00 | 100.00 | 100.00 | 100.00 | 103.00 | 102.00 | 102.00 | 103.00 | 100.40 | 100.40 |
| MILLING TIME AT A TIME OF PIGMENT FORMATION (hr) | | 3 | 3 | 3 | 3 | 3 | 3 | 4 | 4 | 4 | 4 | 4 | 4 |
| REDISPERSION TIME AT A TIME OF INK FORMATION (hr) | | 0.5 | 0.5 | 0.5 | 0.5 | 0.5 | 0.5 | 0.5 | 0.5 | 0.5 | 0.5 | 0.5 | 0.5 |
| PARTICLE DIAMETER | (average) (nm) | 270 | 250 | 255 | 260 | 245 | 270 | 255 | 242 | 255 | 254 | 233 | 250 |
| | (DV90) (nm) | 450 | 472 | 472 | 421 | 413 | 485 | 298 | 348 | 312 | 374 | 254 | 295 |
| SHUTTLE SCANNING SPEED | (m/sec) | 1 | | | | | | 1.2 | | | | | |
| HEAD SHIFT | | PRESENT | | | | | | PRESENT | | | | | |
| EFFECT | GLOSS UNEVENNESS | 5 | | | | | | 5 | | | | | |
| | STICKINESS | 5 | | | | | | 5 | | | | | |
| | FLEXIBILITY | 3 | | | | | | 5 | | | | | |
| | PRODUCTIVITY | 3 | | | | | | 5 | | | | | |

FIG. 15

| | | EXAMPLE 5 | | | | | | EXAMPLE 6 | | | | | |
|---|---|---|---|---|---|---|---|---|---|---|---|---|---|
| | | Y | M | C | K | LM | LC | Y | M | C | K | LM | LC |
| MONOMER | NVC | 14 | 14 | 14.2 | 14 | 14.5 | 14.5 | 14 | 14 | 14.2 | 14 | 14.5 | 14.5 |
| | PEA | 30 | 30 | 30 | 30 | 30 | 30 | 30 | 30 | 30 | 30 | 30 | 30 |
| | EOTMPTA | 14.3 | 8 | 11.55 | 9.4 | 15.55 | 17.67 | 14.3 | 8 | 11.55 | 9.4 | 15.55 | 17.67 |
| | CTFA | | | | | | | | | | | | |
| | IBOA | 14 | 14 | 14 | 14 | 14 | 14 | 14 | 14 | 14 | 14 | 14 | 14 |
| | DPGDA | 10 | 10 | 10 | 10 | 10 | 10 | 10 | 10 | 10 | 10 | 10 | 10 |
| | IRGACURE 819 | 3 | 2.8 | 2.8 | 5 | 2.8 | 2.8 | 3 | 2.8 | 2.8 | 5 | 2.8 | 2.8 |
| | DAROCURE TPO | 2.8 | 2.8 | 2.8 | | 2.9 | 2.9 | 2.8 | 2.8 | 2.8 | | 2.9 | 2.9 |
| | IRGACURE 184 | | | | | 1.6 | 1.6 | | | | | 1.6 | 1.6 |
| POLYMERIZATION INHIBITOR | ITX | 3 | 2 | 2 | 3 | 0.4 | 0.4 | 3 | 2 | 2 | 3 | 0.4 | 0.4 |
| | DETX | 3 | 2 | 2 | 3 | 0.4 | 0.4 | 3 | 2 | 2 | 3 | 0.4 | 0.4 |
| MILL BASE | | 6.4 | 16.4 | 8.65 | 8.05 | 3.25 | 1.13 | 6.4 | 16.4 | 8.65 | 8.05 | 3.25 | 1.13 |
| OLIGOMER | CN964 A85 | 2.5 | | 4 | 3.75 | 5 | 5 | 2.5 | | 4 | 3.75 | 5 | 5 |
| TOTAL | | 103.00 | 102.00 | 102.00 | 103.00 | 100.40 | 100.40 | 103.00 | 102.00 | 102.00 | 103.00 | 100.40 | 100.40 |
| MILLING TIME AT A TIME OF PIGMENT FORMATION (hr) | | 3 | 3 | 3 | 3 | 3 | 3 | 3 | 3 | 3 | 3 | 3 | 3 |
| REDISPERSION TIME AT A TIME OF INK FORMATION (hr) | | 0.5 | 0.5 | 0.5 | 0.5 | 0.5 | 0.5 | 0.5 | 0.5 | 0.5 | 0.5 | 0.5 | 0.5 |
| PARTICLE DIAMETER | (average) (nm) | 270 | 250 | 255 | 260 | 245 | 270 | 270 | 250 | 255 | 260 | 245 | 270 |
| | (DV90) (nm) | 450 | 472 | 472 | 421 | 413 | 485 | 450 | 472 | 472 | 421 | 413 | 485 |
| SHUTTLE SCANNING SPEED (m/sec) | | | | 1.2 | | | | | | 1 | | | |
| HEAD SHIFT | | | | PRESENT | | | | | | PRESENT | | | |
| EFFECT | GLOSS UNEVENNESS | | | 4 | | | | | | 5 | | | |
| | STICKINESS | | | 5 | | | | | | 5 | | | |
| | FLEXIBILITY | | | 5 | | | | | | 5 | | | |
| | PRODUCTIVITY | | | 5 | | | | | | 3 | | | |

FIG. 16

| | | EXAMPLE 7 | | | | | | EXAMPLE 8 | | | | | |
|---|---|---|---|---|---|---|---|---|---|---|---|---|---|
| | | Y | M | C | K | LM | LC | Y | M | C | K | LM | LC |
| MONOMER | NVC | 5 | 5 | 5 | 5 | 5 | 5 | 5 | 5 | 5 | 5 | 5 | 5 |
| | PEA | 36 | 37 | 37.2 | 35 | 35 | 35 | 36 | 37 | 37.2 | 35 | 35 | 35 |
| | EOTMPTA | 14.3 | 8 | 11.55 | 9.4 | 15.55 | 17.67 | 14.3 | 8 | 11.55 | 9.4 | 15.55 | 17.67 |
| | CTFA | | | | | | | | | | | | |
| | IBOA | 14 | 14 | 14 | 14 | 14 | 14 | 14 | 14 | 14 | 14 | 14 | 14 |
| | DPGDA | 10 | 10 | 10 | 10 | 10 | 10 | 10 | 10 | 10 | 10 | 10 | 10 |
| | IRGACURE 819 | 3 | 2.8 | 2.8 | 5 | 2.8 | 2.8 | 3 | 2.8 | 2.8 | 5 | 2.8 | 2.8 |
| | DAROCURE TPO | 2.8 | 2.8 | 2.8 | 2.8 | 2.9 | 2.9 | 2.8 | 2.8 | 2.8 | 2.8 | 2.9 | 2.9 |
| | IRGACURE 184 | | | | | 1.6 | 1.6 | | | | | 1.6 | 1.6 |
| POLYMERIZATION INHIBITOR | ITX | 3 | 2 | 2 | 3 | 0.4 | 0.4 | 3 | 2 | 2 | 3 | 0.4 | 0.4 |
| | DETX | 3 | 2 | 2 | 3 | 0.4 | 0.4 | 3 | 2 | 2 | 3 | 0.4 | 0.4 |
| MILL BASE | | 6.4 | 16.4 | 8.65 | 8.05 | 3.25 | 1.13 | 6.4 | 16.4 | 8.65 | 8.05 | 3.25 | 1.13 |
| OLIGOMER | CN964 A85 | 2.5 | 4 | 4 | 3.75 | 5 | 5 | 2.5 | 4 | 4 | 3.75 | 5 | 5 |
| TOTAL | | 100.00 | 100.00 | 100.00 | 99.00 | 95.90 | 95.90 | 100.00 | 100.00 | 100.00 | 99.00 | 95.90 | 95.90 |
| MILLING TIME AT A TIME OF PIGMENT FORMATION (hr) | | 4 | 4 | 4 | 4 | 4 | 4 | 4 | 4 | 4 | 4 | 4 | 4 |
| REDISPERSION TIME AT A TIME OF INK FORMATION (hr) | | 0.5 | 0.5 | 0.5 | 0.5 | 0.5 | 0.5 | 0.5 | 0.5 | 0.5 | 0.5 | 0.5 | 0.5 |
| PARTICLE DIAMETER | (average) (nm) | 255 | 242 | 255 | 254 | 233 | 250 | 255 | 242 | 255 | 254 | 233 | 250 |
| | (DV90) (nm) | 298 | 348 | 312 | 374 | 254 | 295 | 298 | 348 | 312 | 374 | 254 | 295 |
| SHUTTLE SCANNING SPEED (m/sec) | | 1.2 | | | | | | 2 | | | | | |
| HEAD SHIFT | | PRESENT | | | | | | PRESENT | | | | | |
| EFFECT | GLOSS UNEVENNESS | 5 | | | | | | 3 | | | | | |
| | STICKNESS | 3 | | | | | | 3 | | | | | |
| | FLEXIBILITY | 5 | | | | | | 5 | | | | | |
| | PRODUCTIVITY | 5 | | | | | | 5 | | | | | |

FIG. 17

| | | EXAMPLE 9 | | | | | | EXAMPLE 10 | | | | | |
|---|---|---|---|---|---|---|---|---|---|---|---|---|---|
| | | Y | M | C | K | LM | LC | Y | M | C | K | LM | LC |
| MONOMER | NVC | 3 | 3 | 3 | 3 | 3 | 3 | 8 | 8 | 8 | 8 | 8 | 8 |
| | PEA | 38 | 39 | 39.2 | 37 | 37 | 37 | 33 | 34 | 34.2 | 32 | 32 | 32 |
| | EOTMPTA | 14.3 | 8 | 11.55 | 9.4 | 15.55 | 17.67 | 14.3 | 8 | 11.55 | 9.4 | 15.55 | 17.67 |
| | CTFA | | | | | | | | | | | | |
| | IBOA | 14 | 14 | 14 | 14 | 14 | 14 | 14 | 14 | 14 | 14 | 14 | 14 |
| | DPGDA | 10 | 10 | 10 | 10 | 10 | 10 | 10 | 10 | 10 | 10 | 10 | 10 |
| | IRGACURE 819 | 3 | 2.8 | 2.8 | 5 | 2.8 | 2.8 | 3 | 2.8 | 2.8 | 5 | 2.8 | 2.8 |
| | DAROCURE TPO | 2.8 | 2.8 | 2.8 | 2.8 | 2.9 | 2.9 | 2.8 | 2.8 | 2.8 | 2.8 | 2.9 | 2.9 |
| | IRGACURE 184 | | | | | 1.6 | 1.6 | | | | | 1.6 | 1.6 |
| POLYMERIZATION INHIBITOR | ITX | 3 | 2 | 2 | 3 | 0.4 | 0.4 | 3 | 2 | 2 | 3 | 0.4 | 0.4 |
| | DETX | 3 | 2 | 2 | 3 | 0.4 | 0.4 | 3 | 2 | 2 | 3 | 0.4 | 0.4 |
| MILL BASE | | 6.4 | 16.4 | 8.65 | 8.05 | 3.25 | 1.13 | 6.4 | 16.4 | 8.65 | 8.05 | 3.25 | 1.13 |
| OLIGOMER | CN964 A85 | 2.5 | 4 | 4 | 3.75 | 5 | 5 | 2.5 | 4 | 4 | 3.75 | 5 | 5 |
| TOTAL | | 100.00 | 100.00 | 100.00 | 99.00 | 95.90 | 95.90 | 100.00 | 100.00 | 100.00 | 99.00 | 95.90 | 95.90 |
| MILLING TIME AT A TIME OF PIGMENT FORMATION (hr) | | 4 | 4 | 4 | 4 | 4 | 4 | 4 | 4 | 4 | 4 | 4 | 4 |
| REDISPERSION TIME AT A TIME OF INK FORMATION (hr) | | 0.5 | 0.5 | 0.5 | 0.5 | 0.5 | 0.5 | 0.5 | 0.5 | 0.5 | 0.5 | 0.5 | 0.5 |
| PARTICLE DIAMETER | (average) (nm) | 255 | 242 | 255 | 254 | 233 | 250 | 255 | 242 | 255 | 254 | 233 | 250 |
| | (DV90) (nm) | 298 | 348 | 312 | 374 | 254 | 295 | 298 | 348 | 312 | 374 | 254 | 295 |
| SHUTTLE SCANNING SPEED (m/sec) | | | | 1.2 | | | | | | 1.2 | | | |
| HEAD SHIFT | | | | PRESENT | | | | | | PRESENT | | | |
| EFFECT | GLOSS UNEVENNESS | | | 5 | | | | | | 5 | | | |
| | STICKINESS | | | 3 | | | | | | 4 | | | |
| | FLEXIBILITY | | | 5 | | | | | | 5 | | | |
| | PRODUCTIVITY | | | 5 | | | | | | 5 | | | |

FIG. 18

| | | EXAMPLE 11 | | | | | | EXAMPLE 12 | | | | | |
|---|---|---|---|---|---|---|---|---|---|---|---|---|---|
| | | Y | M | C | K | LM | LC | Y | M | C | K | LM | LC |
| MONOMER | NVC | 10 | 10 | 10 | 10 | 10 | 10 | 18 | 18 | 18 | 18 | 18 | 18 |
| | PEA | 31 | 32 | 32.2 | 30 | 30 | 30 | 23 | 24 | 24.2 | 22 | 22 | 22 |
| | EOTMPTA | 14.3 | 8 | 11.55 | 9.4 | 15.55 | 17.67 | 14.3 | 8 | 11.55 | 9.4 | 15.55 | 17.67 |
| | CTFA | | | | | | | | | | | | |
| | IBOA | 14 | 14 | 14 | 14 | 14 | 14 | 14 | 14 | 14 | 14 | 14 | 14 |
| | DPGDA | 10 | 10 | 10 | 10 | 10 | 10 | 10 | 10 | 10 | 10 | 10 | 10 |
| | IRGACURE 819 | 3 | 2.8 | 2.8 | 5 | 2.8 | 2.8 | 3 | 2.8 | 2.8 | 5 | 2.8 | 2.8 |
| | DAROCURE TPO | 2.8 | 2.8 | 2.8 | 2.8 | 2.9 | 2.9 | 2.8 | 2.8 | 2.8 | 2.8 | 2.9 | 2.9 |
| | IRGACURE 184 | | | | | 1.6 | 1.6 | | | | | 1.6 | 1.6 |
| POLYMERIZATION INHIBITOR | ITX | 3 | 2 | 2 | 3 | 0.4 | 0.4 | 3 | 2 | 2 | 3 | 0.4 | 0.4 |
| | DETX | 3 | 2 | 2 | 3 | 0.4 | 0.4 | 3 | 2 | 2 | 3 | 0.4 | 0.4 |
| MILL BASE | | 6.4 | 16.4 | 8.65 | 8.05 | 3.25 | 1.13 | 6.4 | 16.4 | 8.65 | 8.05 | 3.25 | 1.13 |
| OLIGOMER | CN964 A85 | 2.5 | 4 | 4 | 3.75 | 5 | 5 | 2.5 | 4 | 4 | 3.75 | 5 | 5 |
| TOTAL | | 100.00 | 100.00 | 100.00 | 99.00 | 95.90 | 95.90 | 100.00 | 100.00 | 100.00 | 99.00 | 95.90 | 95.90 |
| MILLING TIME AT A TIME OF PIGMENT FORMATION (hr) | | 4 | 4 | 4 | 4 | 4 | 4 | 4 | 4 | 4 | 4 | 4 | 4 |
| REDISPERSION TIME AT A TIME OF INK FORMATION (hr) | | 0.5 | 0.5 | 0.5 | 0.5 | 0.5 | 0.5 | 0.5 | 0.5 | 0.5 | 0.5 | 0.5 | 0.5 |
| PARTICLE DIAMETER | (average) (nm) | 255 | 242 | 255 | 254 | 233 | 250 | 255 | 242 | 255 | 254 | 233 | 250 |
| | (DV90) (nm) | 298 | 348 | 312 | 374 | 254 | 295 | 298 | 348 | 312 | 374 | 254 | 295 |
| SHUTTLE SCANNING SPEED | (m/sec) | 1.2 | | | | | | 1.2 | | | | | |
| HEAD SHIFT | | PRESENT | | | | | | PRESENT | | | | | |
| EFFECT | GLOSS UNEVENNESS | 5 | | | | | | 5 | | | | | |
| | STICKINESS | 5 | | | | | | 5 | | | | | |
| | FLEXIBILITY | 5 | | | | | | 4 | | | | | |
| | PRODUCTIVITY | 5 | | | | | | 5 | | | | | |

FIG. 19

| | | COMPARATIVE EXAMPLE 1 | | | | | COMPARATIVE EXAMPLE 2 | | | | | |
|---|---|---|---|---|---|---|---|---|---|---|---|---|
| | | Y | M | C | K | LM | LC | Y | M | C | K | LM | LC |
| MONOMER | NVC | 24 | 24 | 24 | 23 | 24 | 24 | 24 | 24 | 24 | 23 | 24 | 24 |
| | PEA | | | | | | | | | | | | |
| | EOTMPTA | 5.3 | 1 | 3.75 | 3.4 | 5.55 | 8.17 | 5.3 | 1 | 3.75 | 3.4 | 5.55 | 8.17 |
| | CTFA | 53 | 51 | 52 | 51 | 54.5 | 54 | 53 | 51 | 52 | 51 | 54.5 | 54 |
| | IBOA | | | | | | | | | | | | |
| | DPGDA | | | | | | | | | | | | |
| | IRGACURE 819 | 3 | 2.8 | 2.8 | 5 | 2.8 | 2.8 | 3 | 2.8 | 2.8 | 5 | 2.8 | 2.8 |
| | DAROCURE TPO | 2.8 | 2.8 | 2.8 | 2.8 | 2.9 | 2.9 | 2.8 | 2.8 | 2.8 | 2.8 | 2.9 | 2.9 |
| | IRGACURE 184 | | | | | 1.6 | 1.6 | | | | | 1.6 | 1.6 |
| POLYMERIZATION INHIBITOR | ITX | 3 | 2 | 2 | 3 | 0.4 | 0.4 | 3 | 2 | 2 | 3 | 0.4 | 0.4 |
| | DETX | 3 | 2 | 2 | 3 | 0.4 | 0.4 | 3 | 2 | 2 | 3 | 0.4 | 0.4 |
| MILL BASE | | 6.4 | 16.4 | 8.65 | 8.05 | 3.25 | 1.13 | 6.4 | 16.4 | 8.65 | 8.05 | 3.250 | 1.13 |
| OLIGOMER | CN964 A85 | 2.5 | | 4 | 3.75 | 5 | 5 | 2.5 | | 4 | 3.75 | 5.000 | 5 |
| TOTAL | | 103.00 | 102.00 | 102.00 | 103.00 | 100.40 | 100.40 | 103.00 | 102.00 | 102.00 | 103.00 | 100.40 | 100.40 |
| MILLING TIME AT A TIME OF PIGMENT FORMATION (hr) | | 4 | 4 | 2 | 2 | 2 | 2 | 3 | 3 | 3 | 3 | 3 | 3 |
| REDISPERSION TIME AT A TIME OF INK FORMATION (hr) | | 0.1 | 0.2 | 0.5 | 0.5 | 0.2 | 0.2 | 0.5 | 0.5 | 0.5 | 0.5 | 0.5 | 0.5 |
| PARTICLE DIAMETER | (average) (nm) | 245 | 285 | 299 | 243 | 265 | 248 | 270 | 250 | 255 | 260 | 245 | 270 |
| | (DV90) (nm) | 520 | 574 | 632 | 647 | 655 | 695 | 450 | 472 | 472 | 421 | 413 | 485 |
| SHUTTLE SCANNING SPEED | (m/sec) | 1.2 | | | | | | 1.2 | | | | | |
| HEAD SHIFT | | PRESENT | | | | | | NOT PRESENT | | | | | |
| EFFECT | GLOSS UNEVENNESS | 1 | | | | | | 1 | | | | | |
| | STICKINESS | 5 | | | | | | 5 | | | | | |
| | FLEXIBILITY | 3 | | | | | | 3 | | | | | |
| | PRODUCTIVITY | 5 | | | | | | 5 | | | | | |

INKJET RECORDING APPARATUS AND INKJET RECORDING METHOD

CROSS-REFERENCE TO RELATED APPLICATIONS

This application is a Continuation of PCT International Application No. PCT/JP2013/077051 filed on Oct. 4, 2013, which claims priority under 35 U.S.C. §119(a) to Japanese Patent Application No. 2012-235712 filed on Oct. 25, 2012. Each of the above applications is hereby expressly incorporated by reference, in its entirety, into the present application.

BACKGROUND OF THE INVENTION

1. Field of the Invention

The present invention relates to an inkjet recording apparatus and an inkjet recording method, and in particular, to a technique for forming an image by discharging inks of a plurality of colors on a recording medium for flexible packaging, such as a film.

2. Description of the Related Art

A recording method with an inkjet system, using an ultraviolet curable ink (UV curable ink) that is cured by irradiation with ultraviolet rays, is known. The UV curable ink has had problems in terms of curability and storage stability.

In this regard, JP2012-92291A describes an ultraviolet curable ink having favorable curability and storage stability.

SUMMARY OF THE INVENTION

In an inkjet recording apparatus, an image is formed by jetting ink droplets at desired positions. In order to land an ink onto a desired position, it is necessary to precisely adjust the scanning speed of a head and the throw distance from the head. Further, the discharge direction and the speed of the ink droplets are greatly affected by the physical properties of the ink, such as viscosity, surface tension, and pigment particle diameter of the ink, and as a result, they have a significant impact on image quality.

In recent years, due to high productivity of inkjet recording apparatus, the scanning speeds of heads tend to be raised. Accordingly, the imbalance in physical properties of inks and the acceptable range of a change in the physical properties of the ink over time have been decreasing. In addition, it becomes difficult to secure the accuracy of landing positions, and thus, the landing interference among colors increases. Thus, gloss unevenness occurs in a recorded image.

On the other hand, in the case where printing is performed on a recording medium of flexible packaging, such as a film, using an inkjet recording apparatus, there are some cases where peeling or cracks occurs in the ink after drying along with the expansion of the medium. Therefore, in the case where printing is performed on such a medium, the flexibility of the ink is required. In order to improve the flexibility of the ink, it is conceivable to reduce the content of N-vinyl caprolactam (NVC) in the ink.

However, if the content of NVC is reduced, there has been a problem in that landing interference increases, and thus gloss unevenness occurs.

The present invention has been made in view of such circumstances, and thus, it is an object of the present invention to provide an inkjet recording apparatus and an inkjet recording method, each of which can record an image having favorable color reproductivity and granularity in a halftone region without gloss unevenness, using an ink with flexibility.

In order to accomplish the aforementioned objects, an inkjet recording apparatus in one aspect includes an inkjet head which has nozzle arrays having nozzles each of which discharges a curable ink cured by applied active energy and which are arranged in a first direction at a pitch P, the nozzle arrays being N (N≥4) nozzle arrays of every color, which respectively discharge thick inks of at least four colors including cyan, magenta, yellow, and black, and the nozzle arrays being arranged to be shifted by P/N away from each other and disposed in the first direction; an active energy imparting device configured to impart the active energy to ink droplets discharged from the nozzles and jetted on a recording surface of a recording medium; a retention device configured to dispose and retain the inkjet head and the active energy imparting device along a second direction orthogonal to the first direction; a scanning device configured to cause the retention device and the recording medium to relatively scan at a speed of equal to or more than 0.9 m/s in the second direction; a movement device configured to cause the retention device and the recording medium to relatively move in the first direction in every scanning action by the scanning device; and a control device configured to cause an image to be formed on the recording surface of the recording medium while causing the inkjet head and the active energy imparting device retained by the retention device to relatively scan each region of the recording medium plural times, in which the curable ink includes an ink pigment and a polymerizable compound containing at least an N-vinyl lactam, the 90% diameter in cumulative volume distribution of the particle diameters of the ink pigment is equal to or less than 500 nm, and the content of N-vinyl lactam is 3% to 24%.

According to this aspect, the content of N-vinyl lactam is 3% to 24%, and thus, both of the flexibility and the curability of the ink can be attained. Further, the 90% diameter in cumulative volume distribution of the particle diameters of the ink pigment is equal to or less than 500 nm, and thus, the curved flying of the ink is prevented and the flying speed of the ink can be kept uniform. As a result, an image having favorable color reproductivity and granularity in a halftone region can be formed. In addition, the nozzle arrays disposed in the first direction at a pitch P are shifted by P/N away from each other in the first direction, and thus, occurrence of the gloss unevenness can be suppressed.

The N-vinyl lactam may be N-vinyl caprolactam. By using the N-vinyl caprolactam, particularly favorable ink curability and adhesion to a recording medium can be obtained.

The control device may form an image by setting the discharge frequency of the inkjet head to equal to or more than 10 kHz or more. Thus, it is possible to form an image appropriately even with an increased relative movement speed by the scanning device.

The curable ink may contain a compound having a sensitizing action on active energy rays at wavelengths of 300 nm to 450 nm Thus, it is possible to cure the ink effectively by irradiation with ultraviolet rays.

In the inkjet head, the nozzles of the curable inks having the lowest curing sensitivity may be arranged on the most upstream side in a direction of movement of the recording medium relative to the inkjet head, and the control device may cause an image to be formed on the recording surface of the recording medium in such a manner that the curable inks of the nozzles which are arranged on the more upstream side in the direction of the movement of the recording medium relative to the inkjet head, may be disposed on a layer closer to the recording surface of the recording medium. Thus, the surface layer can be constantly kept in a stable state all the time, and further, the landing interference between the thick inks can be reduced and thus, the gloss unevenness can be reduced.

The curable ink having the lowest curing sensitivity may be the black ink. The present aspect can be applied to an ink set having such a curing sensitivity.

The respective nozzle arrays of the inkjet head may be configured in such manner that a nozzle of a curable ink having the second lowest curing sensitivity is arranged subsequent to the nozzle of the curable ink having the lowest curing sensitivity from the upstream side in the direction of the movement of the recording medium relative to the inkjet head. Thus, the surface layer can further be constantly kept in a stable state and thus, the gloss unevenness can be reduced.

The respective nozzle arrays of the inkjet head may be configured in such a manner that the nozzles are arranged to be shifted from each other in the first direction in an ascending order of curing sensitivity of curable inks from an upstream side to a downstream side in the direction of the movement of the recording medium relative to the inkjet head. Thus, since the curable ink having the lowest curing sensitivity can be disposed on the layer closest to the recording surface of the recording medium, the surface layer can be constantly kept in a stable state, and thus, the gloss unevenness can be appropriately reduced.

The inkjet head may have N (N≥5) nozzle arrays of every color, which respectively discharge the thick inks and a light ink of at least one color among light inks similar in color tone to the thick inks, and a nozzle of a light ink may be arranged between the two nozzles of different thick inks. Thus, the jetting interference between the thick inks can be reduced, and thus gloss unevenness can be avoided.

The inkjet head may have nozzle arrays which respectively discharge inks of a light cyan color and a light magenta color as the light inks, the nozzles in the respective nozzle arrays in the inkjet head may be arranged to be shifted by P/6 from each other in the first direction, and the nozzle of the light cyan color or the nozzle of the light magenta color is disposed in between the nozzle of the cyan color and the nozzle of the magenta color, between the nozzle of the magenta color and the nozzle of the yellow color, or between the nozzle of the yellow color and the nozzle of the cyan color. The present aspect can be applied to the inkjet recording apparatus which uses inks of light cyan and light magenta colors.

The active energy imparting device may impart the active energy high enough to imperfectly cure ink droplets jetted on the recording surface of the recording medium in a single scanning action by the scanning device. Thus, glossiness can be increased.

The inkjet recording apparatus may further include a second active energy imparting device configured to further impart active energy to the ink droplets imparted with the active energy by the active energy imparting device so as to mainly cure the ink droplets. Thus, the inks can be appropriately cured.

The retention device may retain the second active energy imparting device on the downstream side in the direction of the relative movement of the recording medium. Thus, the inks can be appropriately cured.

The retention device may retain the active energy imparting device on both sides of the inkjet head in the second direction. Thus, the inks can be appropriately and imperfectly cured.

The inkjet head may have nozzle arrays which respectively discharge inks of clear and white colors, on both sides of the N color nozzle arrays in the second direction. The present aspect can be applied to the inkjet recording apparatus which has a clear ink and a white ink.

In order to accomplish the above object, in one aspect, an inkjet recording method includes a retention step of disposing and retaining an inkjet head and an active energy imparting device along a second direction orthogonal to a first direction by a retention device, in which the inkjet head has nozzle arrays having nozzles each of which discharges a curable ink cured by applied active energy and which are arranged in the first direction at a pitch P, the nozzle arrays being N (N≥4) nozzle arrays of every color, which respectively discharge thick inks of at least four colors including cyan, magenta, yellow, and black, and are arranged to be shifted by P/N away from each other in the first direction; and the active energy imparting device imparts the active energy to ink droplets discharged from the nozzles and jetted on a recording surface of a recording medium; a scanning step of causing the retention device and the recording medium to relatively scan at a speed of equal to or more than 0.9 m/s in the second direction; a movement step of causing the retention device and the recording medium to relatively move in the first direction in every scanning action by the scanning step; and a control step of causing an image to be formed on the recording surface of the recording medium while causing the inkjet head and the active energy imparting device retained by the retention device to relatively scan each region of the recording medium plural times, in which the curable ink includes an ink pigment and a polymerizable compound containing at least an N-vinyl lactam, the particle diameters of the ink pigment is equal to or less than 500 nm, and the content of N-vinyl lactam is 3% to 24%.

According to the present aspect, the content of N-vinyl lactam is 3% to 24%, and thus, both the flexibility and the curability of the ink can be attained; the 90% diameter in cumulative volume distribution of the particle diameters of the ink pigment is 500 nm or less, and thus, the curved flying of the ink is prevented; and the flying speed can be kept uniform, and thus, an image having favorable color reproductivity and granularity in a halftone region can be formed. Further, since the nozzle arrays that are disposed in the first direction at a pitch P are shifted by P/N away from each other in the first direction, occurrence of the gloss unevenness can be suppressed.

According to the present invention, an image without gloss unevenness, which has favorable color reproductivity and granularity in a halftone region, can be recorded by using an ink with flexibility.

BRIEF DESCRIPTION OF THE DRAWINGS

FIGS. 6A to 6C are views showing different droplet jetting orders in the interlace method;

FIG. 12 is a table diagram showing the blending amounts of a mill base;

FIG. 13 is a table diagram showing the blending amounts and results of the ink composition of Examples;

FIG. 14 is a table diagram showing the blending amounts and results of the ink composition of Examples;

FIG. 15 is a table diagram showing the blending amounts and results of the ink composition of Examples;

FIG. 16 is a table diagram showing the blending amounts and results of the ink composition of Examples;

FIG. 17 is a table diagram showing the blending amounts and results of the ink composition of Examples;

FIG. 18 is a table diagram showing the blending amounts and results of the ink composition of Examples;

FIG. 19 is a table diagram showing the blending amounts and results of the ink composition of Comparative Examples.

DESCRIPTION OF THE PREFERRED EMBODIMENTS

Hereinafter, embodiments of the present invention will be described in detail with reference to the accompanying drawings.

First Embodiment

[Outline of Inkjet Recording Apparatus]

Figure 1:
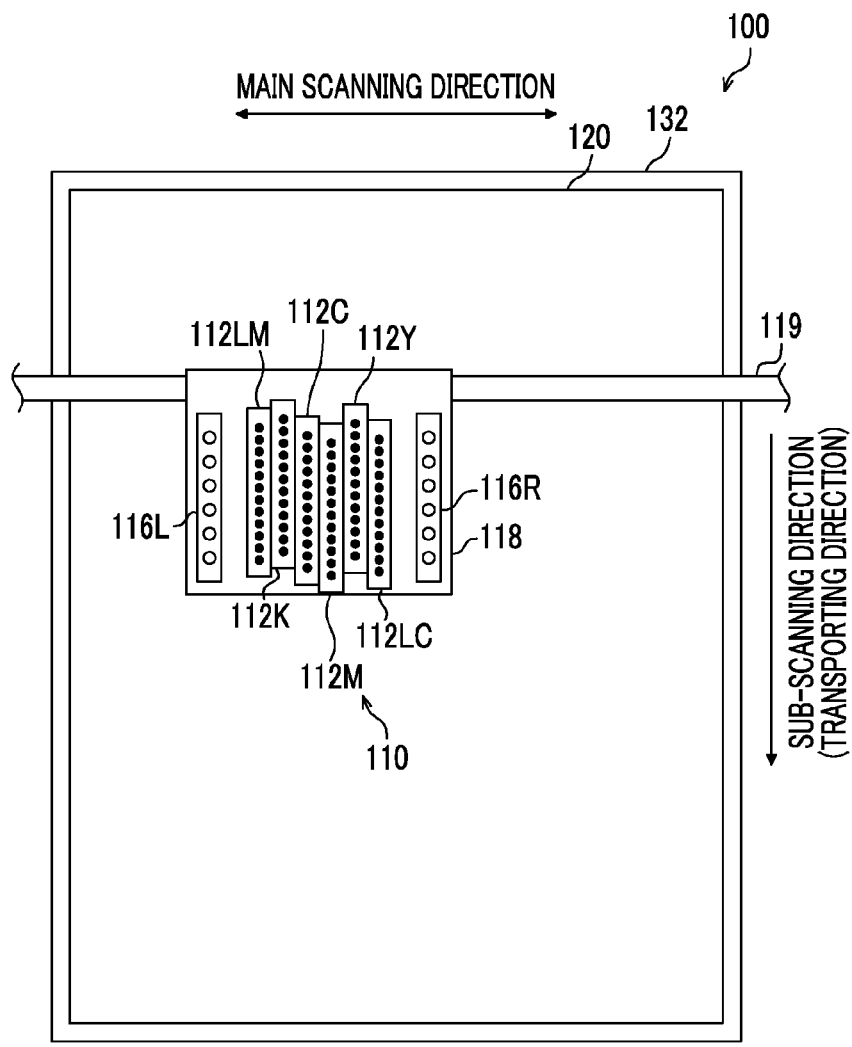
FIG. 1 is an explanatory view for schematically describing the configuration of an inkjet recording apparatus.
Figure 2:
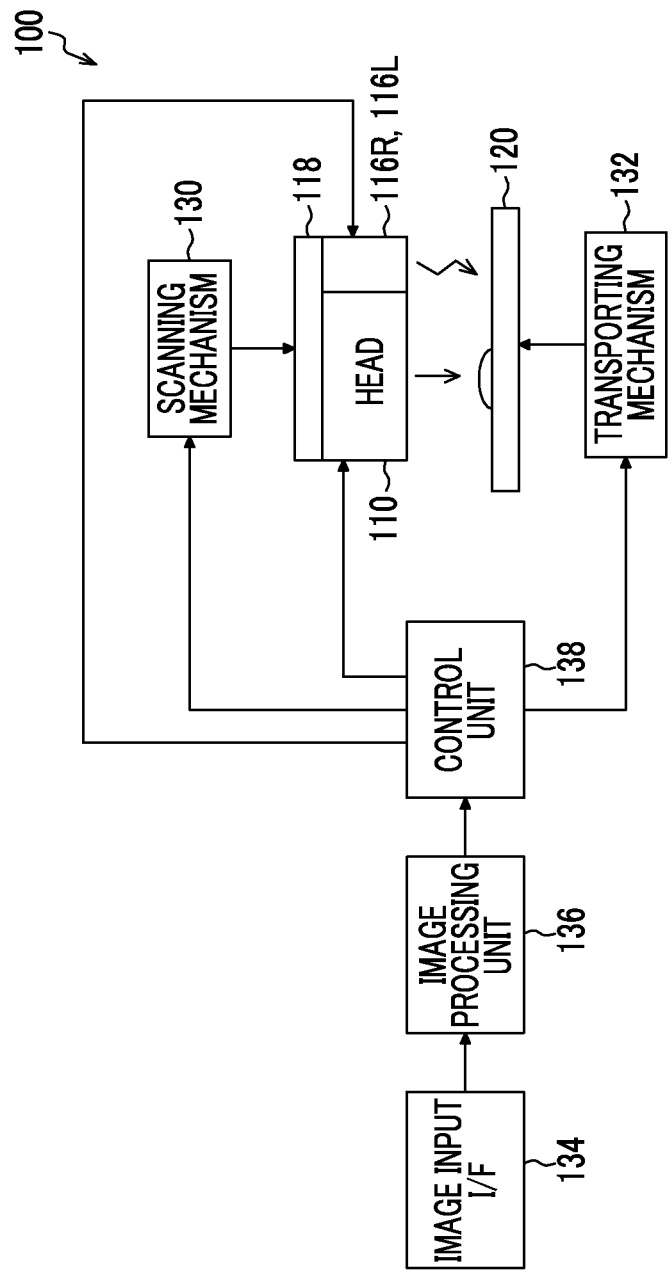
FIG. 2 is a system configuration view of the inkjet recording apparatus.

FIG. 1 is an explanatory view for describing the general configuration of an inkjet recording apparatus 100. Further, FIG. 2 is a system configuration view of the inkjet recording apparatus 100.

The inkjet recording apparatus 100 includes an inkjet head 110, curing light sources 116R and 116L, a carriage 118 (one example of the retention device) carrying these inkjet head 110 and curing light sources 116R and 116L, a carriage scanning mechanism 130 (one example of the scanning device) configured to allow the carriage 118 to scan along a guide 119 which extends in a main scanning direction (corresponding to a second direction), a recording medium transporting mechanism 132 (one example of the movement device) configured to be able to move a recording medium 120, which is placed on an upper surface, in a sub-scanning direction (corresponding to a first direction) orthogonal to the main scanning direction, an image input interface 134 which acquires image data via a wired or wireless communication interface, an image processing unit 136 which performs desired image processing on the inputted image data, and a control unit 138 which collectively controls the inkjet recording apparatus 100, and the like.

Figure 3:
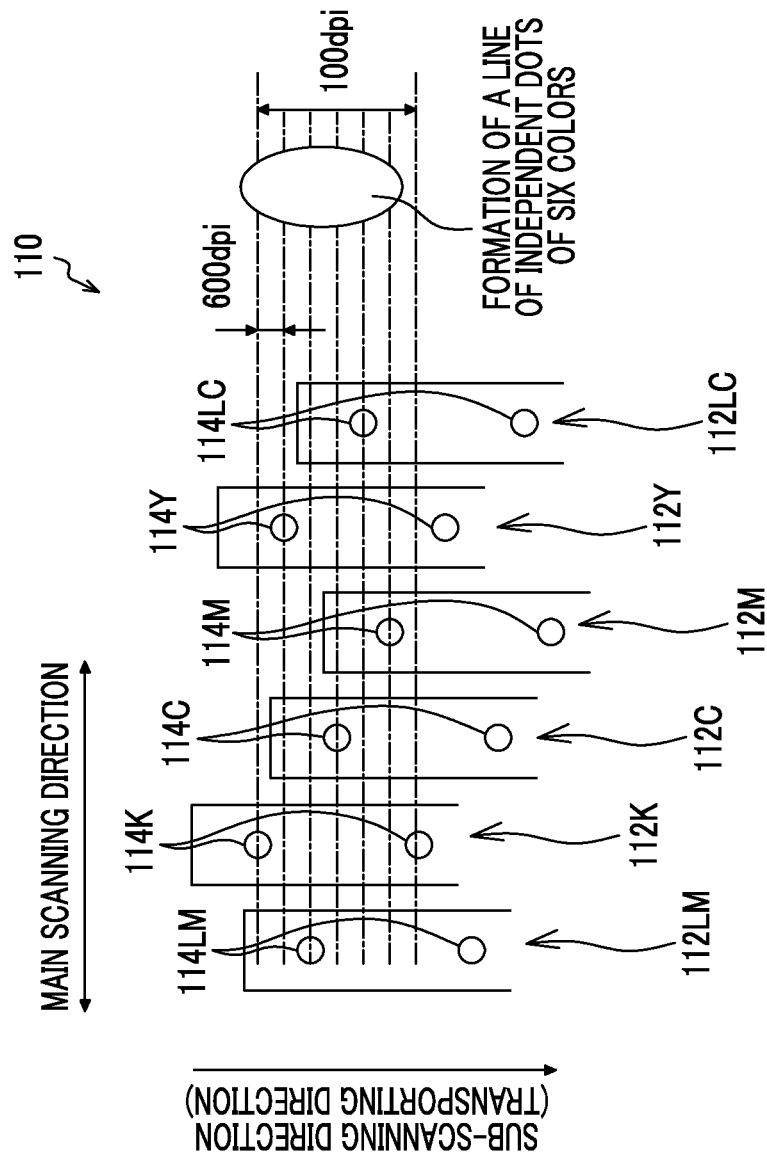
FIG. 3 is an enlarged schematic view of an inkjet head.

FIG. 3 is an enlarged schematic view of the inkjet head 110. The inkjet head 110 includes six heads 112K, 112C, 112M, 112Y, 112LC, and 112LM (one example of nozzle arrays). These six heads 112K, 112C, 112M, 112Y, 112LC, and 112LM have a plurality of nozzles 114K, 114C, 114M, 114Y, 114LC, and 114LM, each for discharging a black ink (K ink), a cyan ink (C ink), a magenta ink (M ink), a yellow ink (Y ink), a light cyan ink (LC ink), and a light magenta ink (LM ink) which are ultraviolet curable inks (one example of UV curable inks cured by imparted active energy). Further, the LC ink is an ink (light ink) having a color tone similar to that of the C ink but has a colorant concentration lower than that of the C ink. Similarly, the LM ink is an ink (light ink) having a color tone similar to that of the M ink but has a colorant concentration lower than that of the M ink.

In the present embodiment, the respective color inks contain N-vinyl caprolactam (NVC) as a polymerizable monomer and a compound having a sensitization action in a wavelength region at 300 nm to 450 nm (for example, ITX) as a photopolymerization initiator. Further, out of the inks of six colors including the K ink, the C ink, the M ink, the Y ink, the LC ink, and the LM ink, the K ink has the lowest curing sensitivity, and the Y ink has the second lowest curing sensitivity with respect to a wavelength (for example, 385 nm) of ultraviolet rays emitted from the curing light sources 116R and 116L. Then, the curing sensitivity is lowered in order of the LM ink, the C ink, the LC ink, and the M ink.

The curing sensitivity herein refers to an amount of energy necessary for completely curing an ink droplet, which is to be cured by irradiation with ultraviolet rays, and the curing sensitivity is higher as the necessary energy amount is smaller. Therefore, "having the lowest curing sensitivity" indicates that a large amount of energy is necessary to completely cure the ink droplet.

Furthermore, the respective color inks of the K ink, the C ink, the M ink, the Y ink, the LC ink, and the LM ink each have 90% accumulation in volume cumulative distribution of the pigment particles (referred to a "pigment particle diameter (DV90)" in some cases in the present specification)" as measured by a dynamic light scattering method is 500 nm or less. If the pigment particle diameter (DV90) is more than 500 nm, the accuracy in the landing position is deteriorated. In the present embodiment, by setting the pigment particle diameter (DV90) to 500 nm or less, the accuracy in the landing position is secured, and the landing interference among the colors is prevented.

A plurality of the nozzles 114K in the head 112K are disposed in one array at regular pitches along the sub-scanning direction. Similarly, a plurality of the nozzles 114C in the head 112C, a plurality of the nozzles 114M in the head 112M, a plurality of the nozzles 114Y in the head 112Y, a plurality of the nozzles 114LC in the head 112LC, and a plurality of the nozzles 114LM in the head 112LM are each disposed in one array at regular pitches along the sub-scanning direction. In this case, pitches of the nozzles 114 in the heads 112 of the respective colors are all 100 dpi.

The heads 112 of the respective colors are disposed in order of 112LM, 112K, 112C, 112M, 112Y, and 112LC from the left side in the main scanning direction.

Moreover, in terms of the sub-scanning direction, the nozzles 114K are disposed on the most upstream side in a recording medium transporting direction. The heads 112 of the respective colors are disposed to be shifted from each other so that the nozzles are arrayed at regular pitches (at pitches of 600 dpi (254 μm/6=about 42 μm)) in order of 114K, 114Y, 114LM, 114C, 114LC, and 114M toward the downstream side. In this case, nozzles (invalid nozzles) which are not for use in printing may be disposed on the side more upstream than the nozzles 114K as long as the nozzles 114K are the nozzles disposed on the most upstream side among the nozzles (valid nozzles) for use in printing.

Thus, the heads 112 of the respective colors are disposed to be shifted by P/N away from each other in the sub-scanning direction, where P designates a nozzle pitch (interval between nozzles) and N designates the number of heads (the number of nozzle arrays).

The inkjet head 110 is made to perform reciprocal scanning in the main scanning direction by a scanning action performed by the carriage 118, and also discharges inks from the nozzles 114 in the heads 112 of the respective colors under the control of the control unit 138, so that ink droplets of respective color inks are jetted on a recording surface of the recording medium 120. In the present embodiment, it is possible for the nozzles 114 in the heads 112 of the respective colors to discharge the ink droplets at a frequency of 10 kHz or more.

Whenever the inkjet head 110 is made to scan in the main scanning direction, the recording medium 120 is transported (scanned) by the recording medium transporting mechanism 132 by a specified amount in the sub-scanning direction. Further, in this specification, the upper side of FIG. 1 is referred to as the upstream side in the transporting direction of the recording medium 120, while the lower side of FIG. 1 is referred to as the downstream side in the transporting direction of the recording medium 120.

The curing light sources 116R and 116L (one example of the active energy imparting device) respectively include a plurality of Ultraviolet-Light Emitting Diodes (UV-LEDs). The curing light sources 116R and 116L are controlled by the control unit 138 so that the UV-LEDs positioned on the upstream side of the carriage 118 in the main scanning direction are turned off and the UV-LEDs positioned on the downstream side are turned on. The turned-on UV-LEDs irradiate ink droplets of the respective color inks, which are discharged from the heads 112 of the respective colors and jetted on the recording medium 120, with ultraviolet rays to imperfectly cure (semi-cure) the ink droplets.

That is, when the inks are discharged from the nozzles 114 in the heads 112 of the respective colors while the carriage 118 moves rightward in FIG. 1, the UV-LEDs of the curing light source 116L positioned on the downstream side in the scanning direction irradiate the ink droplets with ultraviolet rays. When inks are discharged from the nozzles 114 in the heads 112 of the respective colors while the carriage 118 moves leftward in FIG. 1, the UV-LEDs of the curing light source 116R positioned on the downstream side in the scanning direction irradiate the ink droplets with ultraviolet rays.

Ink droplets jetted on the recording medium 120 are not completely cured by once irradiation with ultraviolet rays from the curing light sources 116R and 116L and are put in a semi-cured state. The semi-cured state herein refers to the state of the inks after start of curing and before reaching main curing. The ink droplets in the semi-cured state are put in a mainly cured state by being further irradiated with ultraviolet rays from a main curing light source, which is not shown, disposed on the downstream side in the transporting direction of the recording medium 120. As a result, an image is recorded on the recording surface of the recording medium 120. Note that the phrase, mainly cured state, refers to a state of ink droplets which are cured to an extent where an image is not deteriorated even when transporting of the recording medium 120 is carried out. In other words, the main curing does not necessarily mean that a curing reaction is completed. On the other hand, the phrase, incompletely cured state, refers to a state of ink droplets which initiates the curing of the ink droplets but are cured to an extent where an image is deteriorated when transporting of the recording medium 120 is carried out.

Moreover, an amount of irradiation light from the curing light sources 116R and 116L and an amount of irradiation light from the main curing light source can be set separately. As mentioned before, the glossiness of a recorded image can be increased by reducing the amount of irradiation light at a time of semi-curing.

In the present embodiment, the carriage scanning mechanism 130 scans the carriage 118 at a speed of 0.9 m/s or more (for example, 1.2 m/s) in the main scanning direction from the viewpoint of productivity. That is, head 112 of the respective colors discharges ink droplets onto the recording medium 120 while moving at a relative speed of 0.9 m/s or more. Further, as described above, it is possible for the nozzles 114 in the heads 112 of the respective colors to discharge ink droplets at a frequency of 10 kHz or more. As such, the inkjet recording apparatus 100 is configured to be able to form an image at a high speed.

[Method for Image Formation by Inkjet Recording Apparatus]

Figure 4:
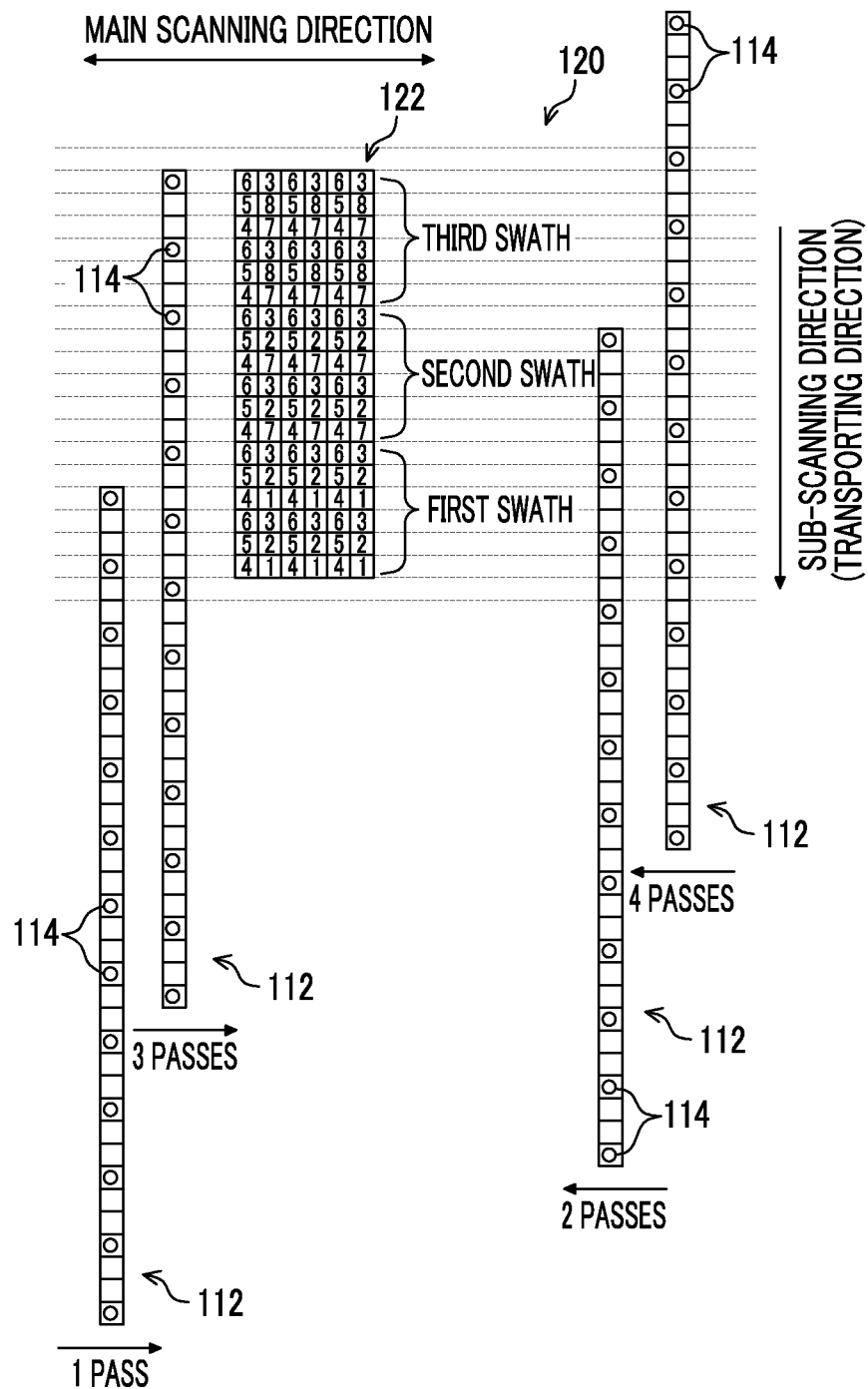
FIG. 4 is a view for describing an interlace method.

FIG. 4 is a view for describing an interlace method (a method for jetting ink droplets in a specified region with a plurality of passes) which is a method for image formation of the inkjet recording apparatus 100. In the inkjet recording apparatus 100, the control unit 138 controls each of the inkjet head 110, the curing light sources 116R and 116L, the carriage scanning mechanism 130, and the recording medium transporting mechanism 132, so that image formation can be carried out according to the interlace method. A description will herein be given of an example where printing is performed by a total of six passes including two passes in the main scanning direction and three passes in the sub-scanning direction.

Reference numeral 122 shown in FIG. 4 designates a recording position (a pixel group) on the recording surface of the recording medium 120 at which ink droplets should be jetted. A digit in each pixel shows the number of passes with which an ink droplet is jetted on the pixel.

First, the inkjet head 110 is made to scan rightward in the main scanning direction by the carriage scanning mechanism 130 (first pass). At this time, inks are discharged from the respective nozzles 114 in the heads 112 of the respective colors and ink droplets of the respective colors are jetted at the position of "1" in the pixel group 122. That is, in the first pass, droplets are jetted on each even array among sub-scanning arrays in the pixel groups 122. As shown in FIG. 3, the respective nozzles 114 in the heads 112 of the respective colors are disposed to be shifted by 600 dpi from each other, and therefore the jetted ink droplets form a line of independent dots of six colors in the range of 100 dpi.

Furthermore, during the first-pass scanning, the curing light source 116L irradiates the ink droplets of the respective colors jetted on the recording surface of the recording medium 120 with ultraviolet rays. As a result, the ink droplets of the respective colors are put in a semi-cured state.

Once the first-pass main scanning is finished, the recording medium 120 is transported by a specified amount in the sub-scanning direction (downward in FIG. 4) by the recording medium transporting mechanism 132. Further, FIG. 4 shows the inkjet head 110 moved by a specified amount to the upper side of FIG. 4 for the sake of explanation.

Next, the inkjet head 110 is made to scan leftward in the main scanning direction (second pass). At this time, inks are discharged from the respective nozzles 114 in the heads 112 of the respective colors, and ink droplets of the respective colors are landed at the positions of "2" in the pixel group 122. That is, in the second pass, droplets are jetted on pixels which belong to each even array among the sub-scanning arrays and which are adjacent (adjacent on the upstream side in the recording medium transporting direction) to main scanning arrays of the pixels subjected to jetting in the first pass (the pixels at the positions of "1" in the pixel group 122). In a similar manner to the first pass, a line of independent dots of six colors is formed in the range of 100 dpi.

During the second-pass scanning, the curing light source 116R irradiates the ink droplets of the respective colors jetted on the recording surface of the recording medium 120 with ultraviolet rays. As a result, the ink droplets of the respective colors jetted during the second pass are put in a semi-cured state. At the same time, the ink droplets jetted during the first pass are also irradiated with ultraviolet rays, by which their curing is promoted.

Once the second-pass main scanning is finished, the recording medium 120 is transported by a specified amount in the sub-scanning direction.

Further, the inkjet head 110 is made to scan rightward in the main scanning direction (third pass). At this time, inks are discharged from the respective nozzles 114 in the heads 112 of the respective colors, and droplets are jetted at the positions of "3" in the pixel group 122. That is, in the third pass, droplets are jetted on pixels which belong to each even array among the sub-scanning arrays and which are adjacent (adjacent on the upstream side in the recording medium transporting direction) to main scanning arrays of the pixels subjected to jetting in the second pass (the pixels at the positions of "2" in the pixel group 122). The curing light source 116L also irradiates the ink droplets jetted during the third pass with ultraviolet rays so as to put the ink droplets in a semi-cured state.

Sub-scanning and main scanning are then repeated in the similar manner, so that droplets are jetted at the positions of "4", "5", and "6" in the pixel group 122. More specifically, droplets are sequentially jetted on each odd array among the sub-scanning arrays.

Thus, ink droplets are jetted on all the pixels of a first swath by the first to sixth passes. Similarly, ink droplets are jetted on all the pixels of a second swath by the second to seventh passes, and ink droplets are jetted on all the pixels of a third swath by the third to eighth passes.

Here, since the heads 112 of the respective colors are arranged in order of 112K, 112Y, 112LM, 112C, 112LC, and 112M in the sub-scanning direction, the K ink with the lowest curing sensitivity is landed on the surface of the recording medium 120 first, and the Y ink with the second lowest curing sensitivity is landed next. Thereafter, landing of inks occurs in ascending order of curing sensitivity, that is, in order of the LM ink, the C ink, the LC ink, and the M ink. Therefore, the K ink, the Y ink, the LM ink, the C ink, the LC ink, and the M ink are disposed on the recording medium surface in this order toward an upper layer thereof.

Figure 5:
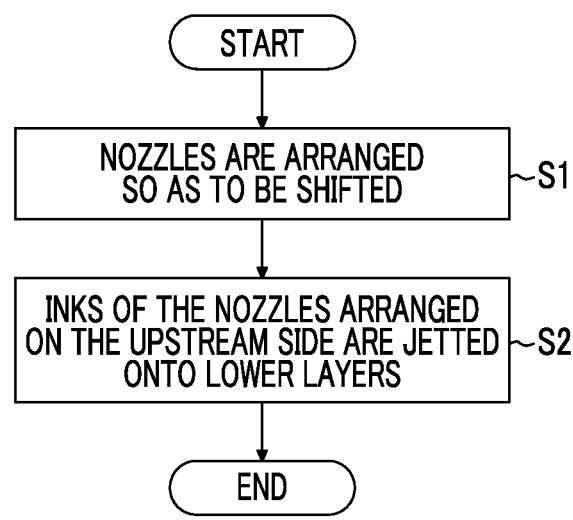
FIG. 5 is a flow chart showing a method for image formation in the present embodiment.

Thus, in the present embodiment, the nozzles are disposed to be shifted in ascending order of cure sensitivity (Step S1 in FIG. 5), so that the inks with lower cure sensitivity are laid on lower layers while the inks with higher cure sensitivity are laid on upper layers (the inks of the nozzles disposed on the more upstream side in the recording medium transporting direction are disposed on lower layers) from an image (Step S2 in FIG. 5). Accordingly, the jetting interference can be reduced, the surface layer can be constantly kept in a stable state, and the gloss unevenness can be reduced.

Furthermore, UV curable inks do not permeate into the inside of a recording medium during curing and form a three-dimensional shape on the surface of the recording medium. Accordingly, in a black solid image made up of 4C colors (the cyan ink, the magenta ink, the yellow ink, and the black ink) that require a large amount of inks to be jetted, gloss unevenness becomes notable. In a high-density image portion made up of the inks of these four types, light inks are hardly used.

Therefore, in the present embodiment, the heads 112 of the respective colors in the sub-scanning direction are arranged so that a nozzle of light ink is placed in between the nozzles of thick inks including the Y ink, the C ink, and the M ink. With such a disposition, even in the case of using an ink, the jetting interference between the thick inks can be reduced, and thus, the gloss unevenness can be avoided.

In this nozzle order in the sub-scanning direction, the nozzles 114 of the respective colors are disposed at pitches of 600 dpi in the range of 100 dpi that is a pitch of the nozzles 114 in the heads 112 of the respective colors. Accordingly, in the inkjet recording apparatus having the light source separated into a light source for semi-curing and a light source for main curing, illuminance of the semi-curing light source can be reduced so that an image having high glossiness and less noticeable gloss unevenness can be formed.

Thus, in consideration of curing sensitivity of inks, positions of the heads 112 of the respective colors in the sub-scanning direction are shifted so that nozzles of the inks with lower sensitivity are positioned on the more upstream side in the recording medium transporting direction, and the nozzle of the light ink is placed in between the nozzles of thick inks so that a space is formed between dots of thick inks at a time of forming a high-density image. As a result, it becomes possible to further reduce a light amount of the semi-curing light source, and to achieve both the increase in glossiness and the avoidance of gloss unevenness at the same time.

Moreover, although inks of two colors, the LC ink and the LM ink, are used as the light ink in the present embodiment, the light ink is not limited to two colors. A light black ink (LK ink) which is similar in color tone to the K ink but has a colorant concentration lower than that of the K ink, and a light yellow ink (LY ink) which is similar in color tone to the Y ink but has a colorant concentration lower than that of the Y ink may be used to constitute a 1 to 4 color configuration. In this case, the heads 112 of the respective colors in the sub-scanning direction are disposed such that the nozzle of light ink is disposed in between the nozzles of thick inks including the K ink, the Y ink, the C ink, and the M ink, so that droplet jetting interference between thick inks can be reduced.

In the present embodiment, a description has been given of an example where images are formed according to the interlace method involving six passes as explained with reference to FIG. 4. However, the number of passes and the jetting order are not limited to the configuration disclosed. For example, as in the case of jetting order shown in FIGS. 6A to 6C, printing may be carried out with a total of ten passes including two passes in the main scanning direction and five passes in the sub-scanning direction, and other printing methods such as interlace printing with 8 passes may also be implemented.

Further, in the present embodiment, the positions of the heads 112 of the respective colors in the sub-scanning direction are shifted so that the nozzles of the inks with lower sensitivity are positioned on the more upstream direction in the recording medium transporting direction. However, if the nozzles of the ink with the lowest curing sensitivity are disposed on the most upstream side, and the ink with the lowest curing sensitivity is disposed on a layer closest to the recording medium, an effect of avoiding gloss unevenness can be obtained to some extent even though other inks are arranged in a different order.

For example, in the case of the ink set of the present embodiment, the nozzle 114K of the ink with the lowest curing sensitivity is disposed on the most upstream side in the transporting direction of the recording medium 120, so that the K ink is jetted on the surface of the recording medium 120 first (that is, the K ink is jetted on the layer closest to the recording surface of the recording medium 120). Other nozzles may be arranged in order of 114K, 114C, 114LM, 114M, 114LC and 114Y, or in order of 114K, 114M, 114LC, 114Y, 114LM, and 114C toward the downstream side.

[Data Processing Method]

Since the positions (of the nozzles 114) of the heads 112 of the respective colors are disposed to be shifted in the sub-scanning direction as shown in FIG. 3, halftone image data are processed so that a halftone data portion at a shifted position is cut off in every raster and transferred to the heads 112 of the respective colors, where droplets of the halftone data are jetted.

Halftone image data are generated on RIP software in the same way as other data, and inputted into the inkjet recording apparatus 100 via the image input interface 134, before being sent to the image processing unit 136. The data sent to and stored in the image processing unit 136 is in the form of a sequence of dots of the respective colors, such as LM, K, C, M, Y, and LC colors, which are obtained by shifting image data by one dot from an upper end of the image in the sub-scanning direction.

In the image processing unit 136, in accordance with a shift amount of the head 112 of the respective colors, image data from a point, which is shifted from given color data used as a reference by an amount closest to the shift amount in the sub-scanning direction, is sent to the control unit 138. In accordance with the shifted disposition, data from the point which is shifted from the reference color data in the sub-scanning direction is transferred to the control unit 138. Accordingly, while a general halftone processing is executed on RIP software, the inkjet recording apparatus 100 side performs output corresponding to the shifted positions of the heads 112 of the respective colors, which makes it possible to execute image formation processing which produces a complete image that is not much affected by the disposition of the heads 112 of the respective colors being shifted.

Although the present embodiment is configured so that the halftone image data are inputted from the image input interface 134, it is possible to adopt the configuration in which an RGB image and the like are inputted and converted into dot data for printing in the image processing unit 136.

Another Embodiment

[General Composition of Inkjet Recording Apparatus]

Figure 7:
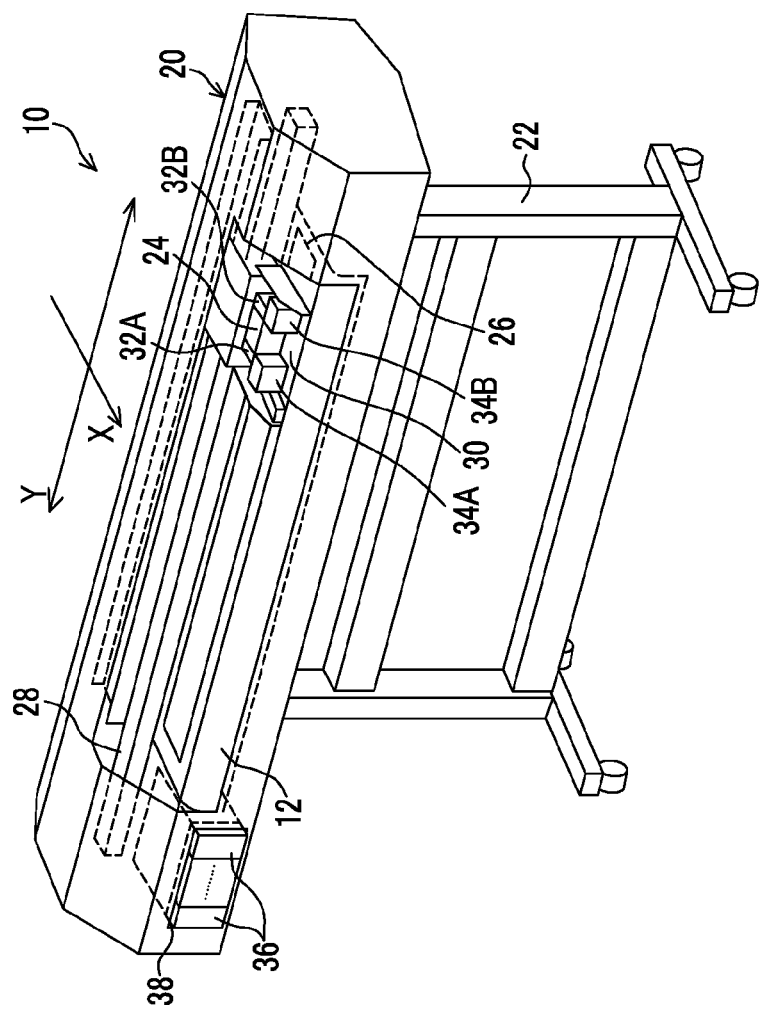
FIG. 7 is a perspective view showing the appearance of the inkjet recording apparatus.

FIG. 7 is a general perspective view of an inkjet recording apparatus according to another embodiment. The inkjet recording apparatus 10 is a wide-format printer which forms a color image on a recording medium 12 by using ultraviolet (UV) curable inks (UV curable inks). The wide-format printer is an apparatus suitable for performing recording in a wide image formation range, such as for large posters or commercial wall advertisements, or the like. Herein, a printer corresponding to a medium having a size of A3+ or greater is referred to as the "wide-format printer".

The inkjet recording apparatus 10 has a main body 20 and a stand 22, which supports the main body 20. The main body 20 is provided with a drop-on-demand type of inkjet head 24 which discharges the inks onto the recording medium (medium) 12; a platen 26, which supports the recording medium 12; and a guide mechanism 28 and a carriage 30 (one example of the scanning device), which form a head movement means.

The guide mechanism 28 is disposed so as to extend above the platen 26, along a scanning direction (Y direction) which is parallel to the medium supporting surface of the platen 26 and perpendicular to a transporting direction of the recording medium 12 (X direction). The carriage 30 is supported so as to be able to reciprocally move along the Y direction along the guide mechanism 28. The inkjet head 24 is mounted on the carriage 30, and provisional curing light sources 32A and 32B and main curing light sources 34A and 34B, which irradiate the inks on the recording medium 12 with ultraviolet rays, are also mounted on the carriage 30.

The provisional curing light sources 32A and 32B are the light sources which irradiate the ink droplets landed on the recording medium 12 discharged from the inkjet head 24 with ultraviolet rays for provisionally curing (semi-curing) the ink droplets to an extent whereby adjacent ink droplets do not combine together. The main curing light sources 34A and 34B are the light sources which additionally irradiate the inks after the provisional curing with ultraviolet rays for completely curing the ink droplets finally (main curing).

The inkjet head 24, the provisional curing light sources 32A and 32B, and the main curing light sources 34A and 34B disposed on the carriage 30 move in unison with (together with) the carriage 30 along the guide mechanism 28.

Various media can be used for the recording medium 12, without any restrictions on the material, such as paper, unwoven fabric, polyvinyl chloride, synthetic chemical fibers, polyethylene, polyesters, and tarpaulin, or whether the media are permeable or non-permeable. The recording medium 12 is supplied in a state of roll paper (shown in FIG. 8) from the back side of the main body 20, and after the printing, the recording medium 12 is taken up by a winding roller (not shown in FIG. 7, and the symbol 44 in FIG. 8) on the front side of the main body 20 (one example of the movement device). The inkjet head 24 discharges the ink droplets onto the recording medium 12 which is transported on the platen 26, and the provisional curing light sources 32A and 32B and the main curing light sources 34A and 34B irradiate the ink droplets attached to the recording medium 12 with ultraviolet rays.

An installation section 38 for ink cartridges 36 is provided on the left-hand front side of the main body 20 in FIG. 7. The ink cartridges 36 are replaceable ink supply sources (ink tanks), which store the UV-curable inks. The ink cartridges 36 are provided correspondingly to the inks of the respective colors which are used in the inkjet recording apparatus 10 of the present embodiment. The ink cartridges 36 of the respective colors are connected to the inkjet head 24 through ink supply channels (not shown) which are independently formed. The ink cartridges 36 are replaced when the amount of remaining ink of the corresponding color has become low.

Furthermore, although not shown in the drawings, a maintenance unit for the inkjet head 24 is provided on the right-hand front side of the main body 20. The maintenance unit is provided with a cap for preventing the inkjet head 24 from drying when not printing, and a wiping member (blade, web, and the like) for cleaning the nozzle surface (ink discharging surface) of the inkjet head 24. The cap covering the nozzle surface of the inkjet head 24 is provided with an ink receptacle for receiving ink droplets discharged from the nozzles for the purpose of maintenance.

[Description of Recording Medium Transport Path]

Figure 8:
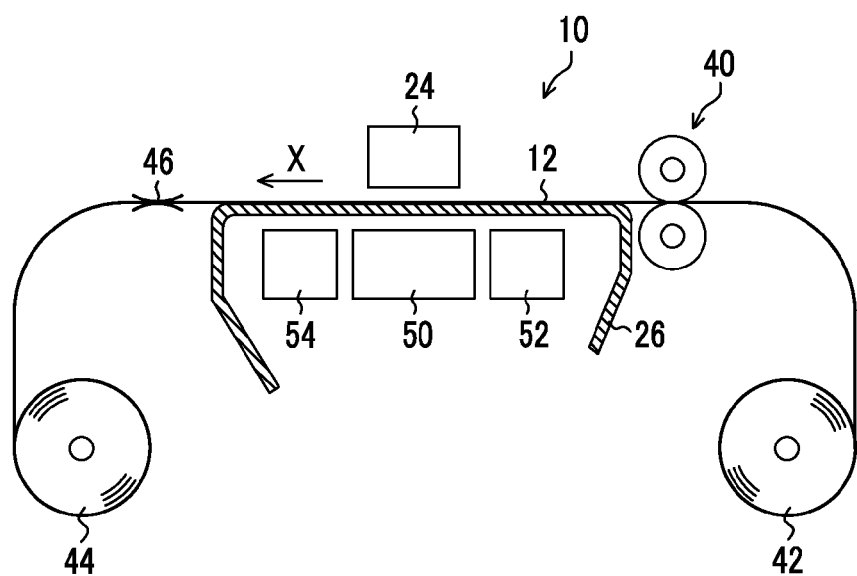
FIG. 8 is a view showing head units in Examples.

FIG. 8 is an explanatory view schematically showing the recording medium transporting path in the inkjet recording apparatus 10. As shown in FIG. 8, the platen 26 is formed in an inverted gutter shape and the upper surface thereof is a supporting surface for the recording medium 12 (which is referred to as a "medium supporting surface"). A pair of nip rollers 40 functioning as a recording medium transporting device for intermittently transporting the recording medium 12 are arranged on the upstream side of the platen 26 in the recording medium transporting direction (X direction), in the vicinity of the platen 26. The nip rollers 40 move the recording medium 12 in the X direction over the platen 26.

The recording medium 12 that is unwound from a supply side roll (referred to as a "pay-out supply roll") 42, which constitutes a roll-to-roll medium transporting device, is intermittently transported in the X direction by the pair of nip rollers 40, which are provided at an entrance of a print unit (on the upstream side of the platen 26 in the recording medium transporting direction). When the recording medium 12 has arrived at the print unit directly below the inkjet head 24, printing is carried out by the inkjet head 24, and the recording medium 12 is then wound up by the winding roller 44 after the printing. A guide 46 for the recording medium 12 is provided on the downstream side of the print unit in the recording medium transporting direction.

A temperature adjustment unit 50 for adjusting the temperature of the recording medium 12 during printing is arranged on the back surface (the surface reverse to the surface supporting the recording medium 12) of the platen 26 at a position opposing the inkjet head 24. The temperature of the recording medium 12 can be adjusted to a specified temperature during printing, so that the viscosity, surface tension, and other physical properties, of the ink droplets landed on the recording medium 12, have desired values and it is possible to obtain a desired dot diameter. According to requirements, the print unit may be provided with a pre-adjustment unit 52 or may be provided with a post-adjustment unit 54 for adjusting the temperature of the recording medium 12 respectively on the upstream side and the downstream side of the temperature adjustment unit 50.

[Description of Inkjet Head]

Figure 9:
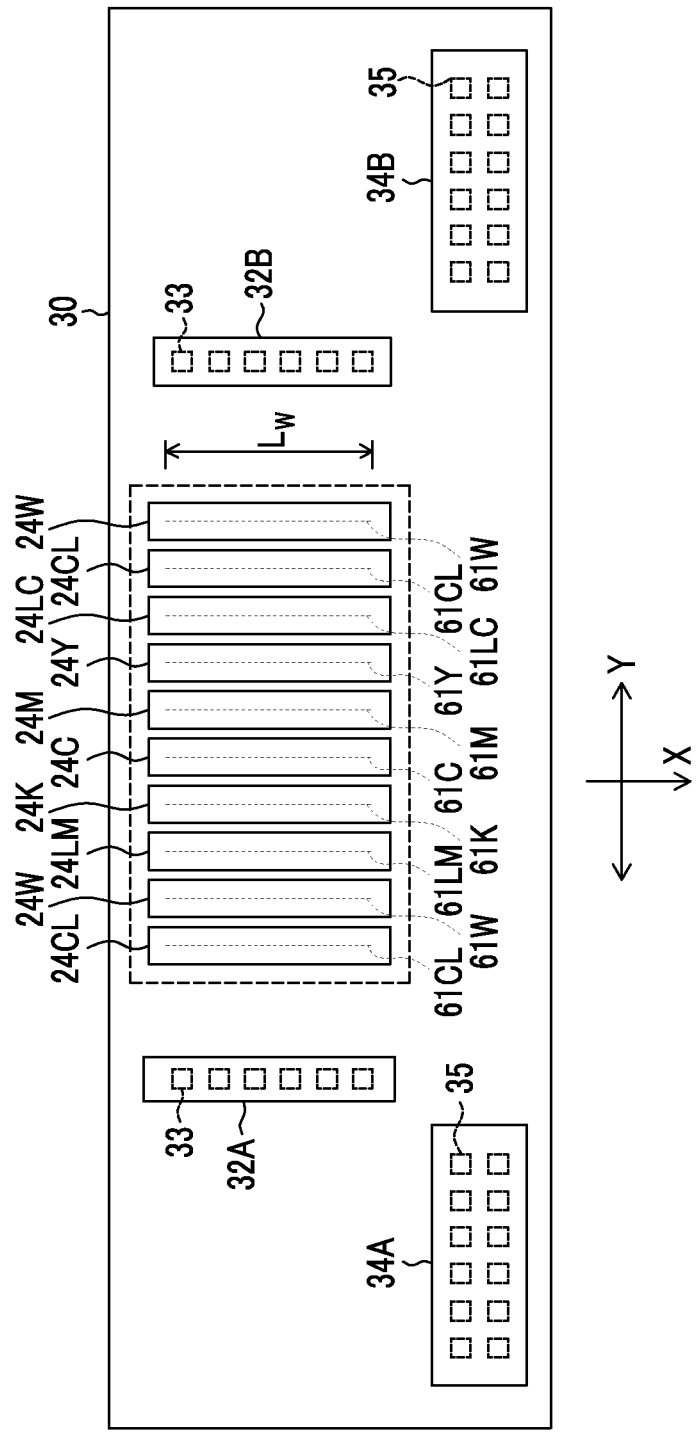
FIG. 9 is a plan perspective view showing a disposition of an inkjet head and a curing light source, disposed on a carriage.

FIG. 9 is a plan perspective view showing an example of the disposition of the inkjet head 24, the provisional curing light sources 32A and 32B and the main curing light sources 34A and 34B, which are disposed on the carriage 30.

The inkjet head 24 has nozzle arrays 61CL, 61W, 61LM, 61K, 61C, 61M, 61Y, 61LC, 61CL, and 61W for discharging droplets of the inks of the color of CL (clear), W (white), LM, K, C, M, Y, and LC, respectively. In FIG. 9, the nozzle arrays are represented as dotted lines, and individual nozzles are not depicted. In the following description, the nozzle arrays 61CL, 61W, 61LM, 61K, 61C, 61M, 61Y, 61LC, 61CL, and 61W may be referred to generally as the nozzle arrays 61 in some cases.

The clear ink is an ink which is jetted from the top of an image formed by another thick ink or light ink, and used to adjust the glossiness of recorded materials. Further, the white ink is an ink which is used for formation of an image on a transparent medium, and in some cases, the ink is jetted onto a transparent medium or jetted from the top of an image formed by another thick ink or light ink.

The types of the ink colors (number of colors) and the combination of the ink colors are not limited to the present embodiment. For example, it is also possible to adopt a mode where the LC and LM nozzle arrays are omitted, a mode where the CL and W nozzle arrays are omitted, a mode where only nozzle arrays in four colors of C, M, Y, and K are included, or a mode where a nozzle array for discharging an ink of a special color is added. Moreover, the disposition sequence in the Y direction of the nozzle arrays of the respective colors is not particularly limited.

The inkjet head 24 capable of color image formation can be composed by forming head modules for the nozzle arrays 61 of the respective colors and arranging the head modules together. For example, it is possible to adopt a mode in which the head modules 24CL, 24W, 24LM, 24K, 24C, 24M, 24Y, and 24LC having the nozzle arrays 61CL, 61W, 61LM, 61K, 61C, 61M, 61Y, and 61LC, respectively, are disposed at regular pitches as aligned along the Y direction of the carriage 30.

The head modules 24CL, 24W, 24LM, 24K, 24C, 24M, 24Y, and 24LC of the respective colors can be interpreted respectively as the "inkjet head". Alternatively, it is also possible to adopt a configuration in which the ink flow channels are divided for the inks of the respective colors inside one inkjet head 24, and the nozzle arrays for discharging the inks in a plurality of colors are provided in the one head.

In the respective nozzle arrays 61, a plurality of nozzles are arranged in one array (on one straight line) along the X direction at regular pitches. In the inkjet head 24 according to the present embodiment, the arrangement pitch of the nozzles constituting each nozzle array 61 (nozzle pitch) is 254 μm (100 dpi), the number of the nozzles constituting each nozzle array 61 is 256, and the total length Lw (corresponding to "a nozzle array length" and also referred to as "a nozzle array width") of each nozzle array 61 is approximately 65 mm (254 μm×255=64.8 mm)

Moreover, in the nozzle arrays 61LM, 61K, 61C, 61M, 61Y, and 61LC, the respective nozzles are disposed to be shifted from each other in the X direction, so that the nozzle array 61K which discharges the K ink with the lowest curing sensitivity and the nozzle array 61Y which discharges the Y ink with the second lowest curing sensitivity are arranged in this order from upstream to downstream in the medium transporting direction. Further, the nozzles of the LM ink and the LC ink, which are light inks, are disposed between the nozzles of the Y ink, the C ink, and the M ink which are thick inks (see FIG. 3). The thick inks with lower curing sensitivity may be disposed on the more upstream side in the medium transporting direction.

Incidentally, the discharge frequency is 15 kHz, and droplets of volumes of three types, 10 pl, 20 pl, and 30 pl, can be selectively discharged, by changing the drive waveforms. That is, dots with three types of sizes, including a small dot, a middle dot, and a large dot, can be formed.

The ink discharge method adopted for the inkjet head 24 is a method (piezo jet method) which blows up a droplet of ink by deformation of a piezoelectric element (piezo actuator). For the discharge energy generating element, apart from an electrostatic actuator (electrostatic actuator method), it is also possible to employ a heat generator such as a heater (heating element) which generates bubbles by heating ink to blow up a droplet of the ink by the pressure of the bubbles (thermal jet method).

[Regarding Arrangement of Ultraviolet Ray Irradiation Device]

As shown in FIG. 9, the provisional curing light sources 32A and 32B are disposed on both the right and left sides of the inkjet head 24 in the scanning direction (Y direction). Further, the main curing light sources 34A and 34B are disposed on the downstream side of the inkjet head 24 in the recording medium transporting direction (X direction).

The ink droplets having been discharged from the nozzles of the inkjet head 24 and landed on the recording medium 12 are irradiated with ultraviolet rays for the provisional curing by the provisional curing light source 32A (or 32B) that passes over the ink droplets immediately after the landing on the recording medium 12. Further, the ink droplets on the recording medium 12 which has passed through the print region of the inkjet head 24 due to the intermittent transporting of the recording medium 12 are irradiated with ultraviolet rays for the main curing by the main curing light sources 34A and 34B.

Further, the provisional curing light sources 32A and 32B and the main curing light sources 34A and 34B may constantly be in a turned-on state during print operation of the inkjet recording apparatus 10, or may be controlled to be turned on and off suitably as necessary.

[Regarding Configuration Example of Provisional Curing Light Source]

As shown in FIG. 9, the provisional curing light sources 32A and 32B are each configured as an array of a plurality of UV-LED elements 33. These two provisional curing light sources 32A and 32B share the same configuration. Although the LED element array made up of six UV-LED elements 33 arrayed in an array along the X direction has been illustrated as the configuration of the provisional curing light sources 32A and 32B in this example, the LED elements and the arrangement configuration thereof are not limited to the example disclosed. For example, it is possible to adopt the configuration in which a plurality of LED elements are disposed in a matrix form in X/Y directions.

These six UV-LED elements 33 are arrayed so that a whole of the region having the same width as the nozzle array width Lw of the inkjet head 24 can be irradiated with ultraviolet rays at once.

[Regarding Configuration Example of Main Curing Light Source]

As shown in FIG. 9, the main curing light sources 34A and 34B are each configured as an array of a plurality of UV-LED elements 35. These two main curing light sources 34A and 34B share the same configuration. In this example, there is illustrated an LED element array (6×2) including six UV-LED elements 35 and two UV-LED elements 35 being arranged, respectively, in the Y direction and X direction in a matrix form as the main curing light sources 34A and 34B.

The disposition of the UV-LED elements 35 in the X direction, which relates to a later-described swath width, is determined so that in one scanning action by the carriage 30, a whole of a region with the width corresponding to 1/n (in which n is a positive integer) of the nozzle array width Lw can be irradiated all at once with ultraviolet rays. In the example of FIG. 9, the UV-LED elements 35 are disposed so that a whole of the region with the width of ½ (n=2) of the nozzle array width Lw may be irradiated all at once.

Further, the number of the LED elements and the arrangement configuration thereof in the main curing light source are not limited to those in the example of FIG. 9. As the light emission sources of the provisional curing light sources 32A and 32B and the main curing light sources 34A and 34B, not only the UV-LED elements 33 and 35 but also UV lamps or the like may be used.

[Image Formation Mode]

The inkjet recording apparatus 10 configured as shown above employs multi-pass image formation control, and the print resolution can be varied by changing the number of printing passes. For example, three image formation modes including high-productivity mode, standard mode and high-quality mode are used, and the print resolutions are different in the respective modes. It is possible to select the image formation mode in accordance with the print objective and application.

In the high-productivity mode, printing is carried out at the resolution of 600 dpi (in the main scanning direction)×400 dpi (in the sub-scanning direction). In the high-productivity mode, the resolution of 600 dpi is achieved by two passes (two scanning actions) in the main scanning direction. First, in the first scan (while the outbound movement of the carriage 30), dots are formed at the resolution of 300 dpi. In the second scan (while the inbound movement of the carriage 30), dots are formed at the resolution of 300 dpi so as to be interpolated between the dots having been formed in the first scan (while the outbound movement), and the resolution of 600 dpi is obtained in the main scanning direction.

On the other hand, with respect to the sub-scanning direction, since the nozzle pitch is 100 dpi, and one main scanning action (one pass) can form dots at the resolution of 100 dpi in the sub-scanning direction. Accordingly, the resolution of 400 dpi is achieved by interpolation printing of four passes (four scans).

Further, in this specification, a product between the number of passes in the main scanning direction and the number of passes in the sub-scanning direction is referred to as the number of passes in an image formation mode. Therefore, the number of passes in the high-productivity mode is equal to 2 main scan pass printing×4 sub-scan pass printing=8 passes.

In the standard mode, printing is carried out at the resolution of 600 dpi×800 dpi. This resolution is obtained by setting two-pass printing in the main scanning direction and eight-pass printing in the sub-scanning direction. In other words, the number of passes in the standard mode is equal to 2 main scan pass printing×8 sub-scan pass printing=16 passes.

Furthermore, in the high-quality mode, printing is carried out at the resolution of 1200 dpi×1200 dpi, which is achieved by unit of printing of four passes in the main scanning direction and twelve passes in the sub-scanning direction. In other words, the number of passes in the high-quality mode is equal to 4 main scan pass printing×12 sub-scan pass printing=48 passes.

[Description of Ink Supply System]

Figure 10:
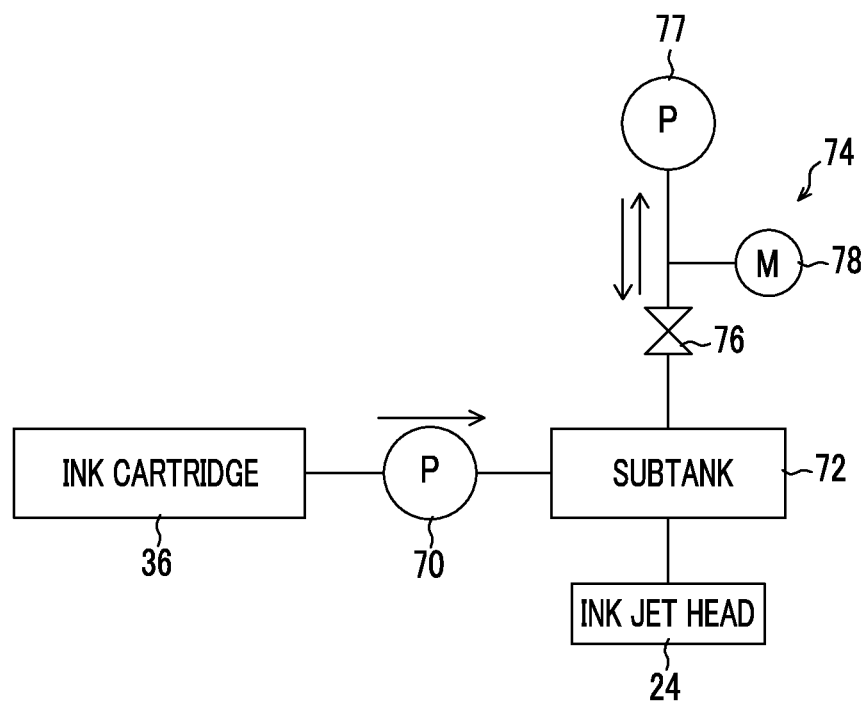
FIG. 10 is a block diagram showing the configuration of the ink supply system.

FIG. 10 is a block diagram showing the configuration of an ink supply system in the inkjet recording apparatus 10. As shown in FIG. 10, the inks housed in the ink cartridge 36 are sucked by a feed pump 70, and is sent to the inkjet head 24 via a subtank 72. The subtank 72 is provided with a pressure regulation means 74 for regulating the pressure of the inks inside the subtank 72.

The pressure regulation means 74 is equipped with a pressure adjustable pump 77 that communicates with the subtank 72 via a valve 76 and a manometer 78 provided between the valve 76 and the pressure adjustable pump 77.

In general printing operations, the pressure adjustable pump 77 is operated in the direction of sucking the inks inside the subtank 72, so that the internal pressure of the subtank 72 and the internal pressure of the inkjet head 24 are maintained as negative pressure. In maintenance operation of the inkjet head 24, the pressure adjustable pump 77 is operated in the direction of pressurizing the inks in the subtank 72 so that pressure is forcibly applied to the inside of the subtank 72 and the inside of the inkjet head 24, and the inks in the inkjet head 24 are discharged via a nozzle. The inks forcibly discharged from the inkjet head 24 are gathered in the aforementioned ink receptacle of the cap (not shown).

[Description of Control System of Inkjet Recording Apparatus]

Figure 11:
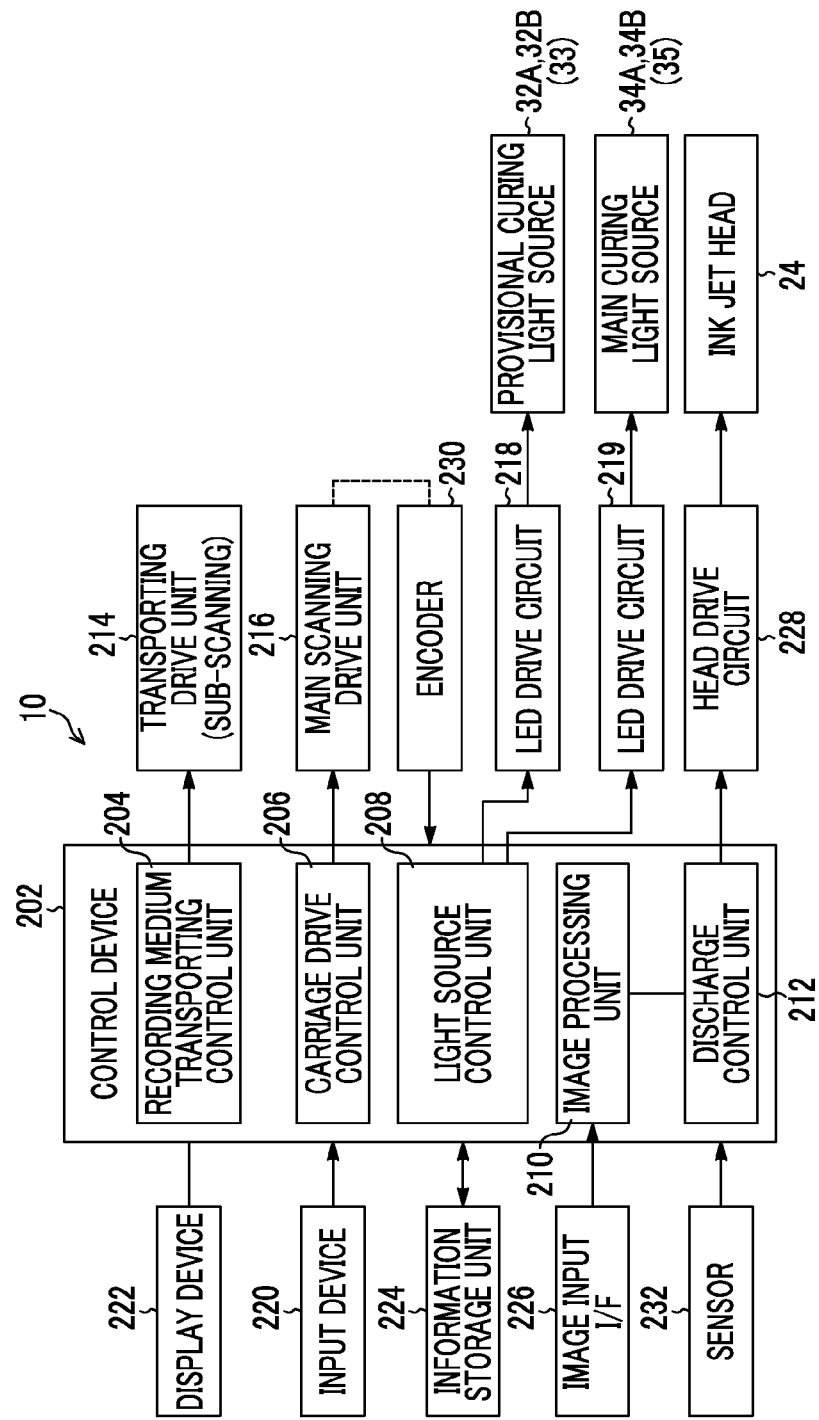
FIG. 11 is a block diagram showing the configuration of the inkjet recording apparatus.

FIG. 11 is a block diagram showing configuration of the inkjet recording apparatus 10. As shown in FIG. 11, the inkjet recording apparatus 10 is provided with a control device 202. For the control device 202, for example, it is possible to use a computer equipped with a central processing unit (CPU), or the like. The control device 202, which is equivalent to the control unit 138 shown in FIG. 2, functions as a control unit for controlling the whole of the inkjet recording apparatus 10 in accordance with prescribed programs, as well as functions as a calculation device for performing respective calculations. The control device 202 includes a recording medium transporting control unit 204, a carriage drive control unit 206, a light source control unit 208, an image processing unit 210, and a discharge control unit 212. Each of these units is achieved by a hardware circuit or software, or a combination of these.

The recording medium transporting control unit 204 controls a transporting drive unit 214 for transporting the recording medium 12 (see FIG. 7). The transporting drive unit 214, which is equivalent to the transporting mechanism 132 shown in FIG. 2, includes a drive motor which drives the nip rollers 40 shown in FIG. 8, and a drive circuit thereof. The recording medium 12 which is transported on the platen 26 (see FIG. 7) is transported intermittently in a unit of the swath width in the sub-scanning direction, in accordance with a reciprocal scanning action (printing pass action) in the main scanning direction performed by the inkjet head 24.

The carriage drive control unit 206 shown in FIG. 11 controls a main scanning drive unit 216 for moving the carriage 30 (see FIG. 7) in the main scanning direction. The main scanning drive unit 216, which is equivalent to the scanning mechanism 130 shown in FIG. 2, includes a drive motor which is connected to a movement mechanism of the carriage 30, and a control circuit thereof.

The light source control unit 208 is a control means that adjusts the amount of light emission by the UV-LED elements 33 of the provisional curing light sources 32A and 32B through an LED drive circuit 218, as well as controls the amount of light emission by the UV-LED elements 35 of the main curing light sources 34A and 34B through an LED drive circuit 219.

The LED drive circuit 218 outputs voltage of a voltage value corresponding to a command from the light source control unit 208, and adjusts the amount of light emission by the UV-LED elements 33. Further, the LED drive circuit 219 outputs voltage of a voltage value corresponding to a command from the light source control unit 208, and adjusts the amount of light emission by the UV-LED elements 35. Adjustment of the amount of light emission from the LEDs may be achieved not by changing the voltage but by changing a Duty ratio of a drive waveform with use of Pulse Width Modulation (PWM), or by changing both the voltage value and the Duty ratio.

An input device 220 such as an operating panel, and a display device 222 are connected to the control device 202.

The input device 220 is a device by which external operating signals are manually inputted to the control device 202, and can employ various modes, such as a keyboard, a mouse, a touch panel, operating buttons, or the like. The display device 222 can employ various modes, such as a liquid crystal display, an organic electroluminescence display, and CRT. An operator is able to select an image formation mode, input print conditions, and input and edit additional conditions, and the like, by operating the input device 220, and is able to confirm the input details and various types of information such as search results, through the display on the display device 222.

Furthermore, the inkjet recording apparatus 10 is provided with an information storage unit 224, which stores various types of information, and an image input interface 226 for acquiring image data for printing. It is possible to employ a serial interface or a parallel interface for the image input interface. It is also possible that the image input interface is provided with a buffer memory (not shown) for achieving high-speed communications.

The image data inputted through the image input interface 226 is converted into data for printing (dot data) by the image processing unit 210. In general, the dot data is generated by subjecting the multiple-tone image data to color conversion processing and halftone processing.

The means for the halftone processing can employ commonly known means of various kinds, such as an error diffusion method, a dithering method, a threshold value matrix method, and a density pattern method. The halftone processing generally converts tonal image data having M values (M≥3) into tonal image data having N values (N<M). In the simplest example, the image data is converted into dot image data having 2 values (dot on/off), but in a halftone processing, it is also possible to perform quantization in multiple values which correspond to different types of dot sizes (for example, three types of dots, a large dot, a medium dot, and a small dot).

The binary or multiple-value image data (dot data) obtained in this way is used for "driving (on)" or "not driving (off)" the respective nozzles, or in the case of multiple-value data, is also used as ink discharge data (jetting control data) for controlling the discharged droplet volumes (dot sizes).

The discharge control unit 212 generates discharge control signals for a head drive circuit 228 in accordance with the dot data generated in the image processing unit 210. Further, the discharge control unit 212 includes a drive waveform generation unit which is not shown. The drive waveform generation unit is a means which generates a drive voltage signal for driving the discharge energy generation elements (in the present Example, the piezoelectric elements) which correspond to the respective nozzles of the inkjet head 24.

The waveform data of the drive voltage signal is previously stored in the information storage unit 224 and waveform data to be used is outputted as necessary. The signal (drive waveform) outputted from the drive waveform generation unit is supplied to the head drive circuit 228. The signal outputted from the drive waveform generation unit may be digital waveform data or an analog voltage signal.

A common drive voltage signal is applied to the discharge energy generation elements of the inkjet head 24 though the head drive circuit 228 while switching elements (not shown) connected to the individual electrodes of the energy generating elements are turned on and off in accordance with the discharge timings of the respective nozzles, so that the ink is discharged from the corresponding nozzles.

Programs to be executed by the CPU of the control device 202, and various data and the like required for control purposes are stored in the information storage unit 224. The information storage unit 224 stores resolution setting information corresponding to the image formation mode, the number of passes (number of scanning repetitions), emission amount information for the provisional curing light sources 32A and 32B and the main curing light sources 34A and 34B, and the like.

An encoder 230 is installed on a drive motor which drives the main scanning drive unit 216 and a drive motor which drives the transporting drive unit 214 to output pulse signals corresponding to the rotation amount and rotation speed of the drive motors, and the outputted pulse signals are sent to the control device 202. Based on the pulse signals outputted from the encoder 230, the position of the carriage 30 and the position of the recording medium 12 (see FIG. 7) are ascertained.

A sensor 232 is installed on the carriage 30, and the width of the recording medium 12 is ascertained in accordance with a sensor signal obtained from the sensor 232.

According to the inkjet recording apparatus 10 configured as shown above, the heads of the respective ink colors are each shifted from each other in the range of a nozzle pitch in the recording medium transporting direction, the heads of the inks with lower sensitivity are disposed on the more upstream side in the recording medium transporting direction so that the inks with lower sensitivity are disposed on lower layers for recording. As a result, the surface layer can be constantly kept in a stable state, and thus, thus gloss unevenness can be reduced.

(Ink Composition)

Next, the ink composition used in the present embodiment will be described. The ink composition that can be used in the present embodiment includes 3% to 24% of N-vinyl lactam (component A-1) as a polymerizable compound (component A).

Polymerizable Compound (Component A)

The amount of the dischargeable ink (the thickness of the ink) per unit area, which is determined from a head discharge volume (the amount of the ink droplets per discharge), a nozzle density, a shuttle scanning speed, a discharge frequency, a transporting pitch of a recording medium, and the like, which is chosen as a printer system (component A), the type of the pigment and the concentration of the ink is determined so as to achieve a desired optical concentration. Further, an ink is prepared by appropriately adding a dispersant according to the kind of a pigment. Accordingly, the polymerizable compound is preferably in a ratio obtained by subtracting pigments, pigment dispersants, pigment dispersion aids, surfactants, viscosity adjusting agents, resins, and the like in the ink composition from 100%. Specifically, since the amount of coloring materials such as pigments and dyes, or the like to be added is little although varying depending on the color, the component A is preferably contained in the content of 80% to 99.7%.

N-Vinyl Lactam (Component A-1)

The ink composition used in the present embodiment contains 3% to 24% of an N-vinyl lactam (component A-1). When the ink composition contains 3% to 24% of N-vinyl lactam, the flexibility of the ink after jetting can be kept.

Examples of the N-vinyl lactam include compounds represented by Formula (1).

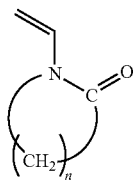

(1)

In Formula (1), n represents an integer of 2 to 6, and from the viewpoints of the flexibility after curing of the ink composition, adhesion to a recording medium, and availability of raw materials, n is preferably an integer of 3 to 5, more preferably 3 or 5, and particularly preferably 5, which corresponds to N-vinyl caprolactam. The N-vinyl caprolactam is favorable in safety, is used for general use, and can be available at a relatively low price, and in particular, it preferably provides good ink curability and good adhesion to a recording medium of a cured film.

Furthermore, in the N-vinyl lactam, hydrogen atoms on lactam rings may be substituted with substituents such as an alkyl group and an aryl group, and lactam rings may be linked to saturated or unsaturated ring structures.

The compounds represented by Formula (1) may be used alone or in combination of two or more kinds thereof.

The content of N-vinyl lactam is preferably 3% to 24%, more preferably from 8% to 18%, and still more preferably from 10% to 15%, with respect to the total ink composition. If the content of N-vinyl lactam is more than the range, the flexibility of an ink after image formation is deteriorated, whereas if the content is less than the range, the curability of an ink is deteriorated, which is thus not preferable.

Furthermore, the ink composition may contain a divinyl ether compound (component A-2) and a (meth)acrylate monomer (component A-3) as the polymerizable compound (component A). Hereinafter, specific examples of the divinyl ether compound (component A-2) and the (meth)acrylate monomer (component A-3) will be described.

Divinyl Ether Compound (Component A-2)

The ink composition used in the present embodiment can contain a divinyl ether compound (component A-2) as the polymerizable compound (component A). By incorporating the divinyl ether compound, an image having glossiness is obtained. From the viewpoint of curability, vinyl ethers cannot be used at a high content due to lower curability as compared with acrylates, but when the divinyl ether compound (component A-2) is contained in the ink composition, the content thereof is preferably 20% or less.

The divinyl ether compound is not particularly limited as long as it is a compound containing two vinyl ether groups ($CH_2$=CH—O—) in the molecule, but is preferably a divinyl ether compound with a (poly)oxyalkylene skeleton, a vinyl ether compound with an alkylene skeleton, or a vinyl ether compound with a cycloalkane skeleton.

Examples of the divinyl ether compound with a (poly)oxyalkylene skeleton include ethylene glycol divinyl ether, polyethylene glycol divinyl ether, propylene glycol divinyl ether, polypropylene glycol divinyl ether, butylene glycol divinyl ether, and polybutylene glycol divinyl ether.

Examples of the divinyl ether compound with an alkylene skeleton include 1,6-hexanedioldivinyl ether, 1,9-nonanedioldivinyl ether, 1,10-decanedioldivinyl ether, neopentyl glycol divinyl ether, and neopentyl glycol hydroxypivalate divinyl ether.

The divinyl ether with a cycloalkane skeleton is not particularly limited, and examples thereof include 1,4-cyclohexanedioldivinyl ether, 1,4-cyclohexanedimethanol divinyl ether, tricyclodecanediol divinyl ether, tricyclodecanedimethanol divinyl ether, pentacyclopentadecanedimethanol divinyl ether, and pentacyclopentadecanediol divinyl ether.

Among these, a divinyl ether with an alkylene skeleton and a divinyl ether compound with a (poly)oxyalkylene skeleton are preferable, a divinyl ether compound with a (poly)oxyalkylene skeleton is more preferable, and a divinyl ether compound with a polyoxyalkylene skeleton is still more preferable.

An oxyalkylene group is preferably an oxyalkylene group having 2 to 6 carbon atoms, more preferably an oxyalkylene group having 2 to 4 carbons, and preferably an oxyethylene group or an oxypropylene group.

With regard to the divinyl ether compound with a polyoxyalkylene skeleton, the repeating number of oxyalkylene group is preferably 1 to 10, more preferably 2 to 8, and still more preferably 2 to 6. Further, the molecular weight is preferably 100 to 1,000, more preferably 150 to 800, and still more preferably 180 to 600.

(Meth)Acrylate Monomer (Component A-3)

The ink composition used in the present embodiment preferably contains a (meth)acrylate monomer (component A-3) from the viewpoint of curability.

The (meth)acrylate monomer is preferably a low-molecular monomer having a molecular weight of 1,000 or less, and preferably having a molecular weight of 200 to 750.

The (meth)acrylate monomer means a methacrylate monomer and/or an acrylate monomer, and more preferably an acrylate monomer.

The component A-3 may be either a polyfunctional(meth) acrylate monomer (component A-3-1) or a monofunctional (meth)acrylate monomer (component A-3-2), and is not particularly limited.

Polyfunctional (Meth)Acrylate Monomer (Component A-3-1)

The ink composition used in the present embodiment may contain a polyfunctional (meth)acrylate monomer (component A-3-1). When the polyfunctional (meth)acrylate monomer (component A-3-1) is contained in the ink composition, the content thereof is preferably 20% or less.

The polyfunctional (meth)acrylate monomer that can be used in the present invention is a polyfunctional monomer containing two or more groups selected from the group consisting of an acryloxy group and a methacryloxy group. By incorporating the polyfunctional (meth)acrylate monomer, an ink composition having favorable curability and high cured film strength is obtained.

Specific examples of the component A-3-1 include bis(4-acryloxypolyethoxyphenyl)propane, neopentyl glycol di(meth)acrylate, ethoxylated (2) neopentyl glycol di(meth) acrylate (compound formed by diacrylating neopentyl glycol ethylene oxide 2 mole adduct), propoxylated (2) neopentyl glycol di(meth)acrylate (compound formed by diacrylating neopentyl glycol propylene oxide 2 mole adduct), 1,6-hexanediol di(meth)acrylate, 1,9-nonanediol di(meth)acrylate, ethylene glycol di(meth)acrylate, diethylene glycol di(meth) acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, tetrapropylene glycol di(meth)acrylate, polypropylene glycol di(meth)acrylate, pentaerythritol tri (meth)acrylate, pentaerythritol tetra(meth)acrylate, dipentaerythritol tetra(meth)acrylate, trimethylolpropane tri(meth) acrylate, tetramethylolmethane tetra(meth)acrylate, tetramethylolmethane tri(meth)acrylate, dimethyloltricyclodecane di(meth)acrylate, modified glycerol tri(meth)acrylate, modified bisphenol A di(meth)acrylate, bisphenol A propylene oxide (PO) adduct di(meth)acrylate, bisphenol A ethylene oxide (EO) adduct di(meth)acrylate, dipentaerythritol hexa(meth)acrylate, and caprolactone-modified dipentaerythritol hexa(meth)acrylate.

Further, an alkylene oxide group-containing poly(meth) acrylate is preferably contained as the component A-3-1. Here, the "poly(meth)acrylate" means that it contains two or more (meth)acrylic acid ester residues in the molecule; it preferably contains 2 to 4 residues, and more preferably contains two (meth)acrylic acid ester residues. The alkylene oxide is preferably ethylene oxide and/or propylene oxide. The number of moles of alkylene oxide group added is preferably 1 to 10, and more preferably 1 to 6. This polyfunctional monomer is obtained by adding an alkylene oxide to a glycol and forming a polyester of (meth)acrylic acid.

Specific examples of the alkylene oxide group-containing (meth)acrylate include di(meth)acrylate of a bisphenol A PO adduct, di(meth)acrylate of a bisphenol A EO adduct, and propoxylated neopentyl glycol di(meth)acrylate.

The components A-3-1 may be used alone or in combination of two or more kinds thereof as appropriate.

Monofunctional (Meth)Acrylate Monomer (Component A-3-2)

The ink composition of the present embodiment can contain a monofunctional (meth)acrylate monomer (component A-3-2) as the (meth)acrylate monomer (component A-3). When the monofunctional (meth)acrylate monomer (component A-3-2) is contained in the ink composition, the content thereof is preferably in the range of 10% to 90%. Examples of the monofunctional (meth)acrylate monomer include the radically polymerizable monomers described in JP2009-221414A, the polymerizable compounds described in JP2009-209289A, and the ethylenically unsaturated compounds described in JP2009-191183A.

Examples of the monofunctional (meth)acrylate compound include tetrahydrofurfuryl (meth)acrylate, norbornyl (meth)acrylate, isobornyl (meth)acrylate, cyclohexyl (meth) acrylate, cyclopentyl (meth)acrylate, cycloheptyl (meth) acrylate, cyclooctyl (meth)acrylate, cyclodecyl (meth)acrylate, dicyclodecyl (meth)acrylate, 3,3,5-trimethylcyclohexyl (meth)acrylate, 4-t-butylcyclohexyl (meth)acrylate, acryloylmorpholine, N-phthalimidoethyl (meth)acrylate, pentamethylpiperidyl (meth)acrylate, tetramethylpiperidyl (meth)acrylate, 5-(meth)acryloyloxymethyl-5-ethyl-1,3-dioxacyclohexane, 2-ethylhexyl (meth)acrylate, 2-hydroxyethyl (meth)acrylate, 2-butoxyethyl (meth)acrylate, carbitol (meth)acrylate, methyl (meth)acrylate, n-butyl (meth)acrylate, 2-(2-ethoxyethoxyl)ethyl (meth)acrylate, 2-(2-butoxyethoxyl)ethyl (meth)acrylate, and dimethylaminomethyl (meth)acrylate.

Among these, isobornyl (meth)acrylate is preferable, and isobornyl acrylate is particularly preferable.

As the monofunctional (meth)acrylate monomer, a phenyl group-containing compound represented by Formula (2) may also be used.

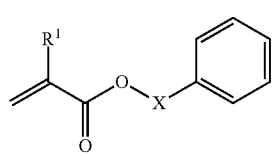

(2)

(In Formula (2), $R^1$ represents a hydrogen atom or a methyl group, and X represents a single bond or a divalent linking group.) $R^1$ in Formula (2) represents a hydrogen atom or a methyl group, and is preferably a hydrogen atom in terms of a curing rate.

Preferred examples of X in Formula (2) include an alkylene group and a group formed by combining one or more alkylene group and one or more bond selected from the group consisting of an ether bond, an ester bond, a urethane bond, and a urea bond; and more preferred examples include an alkylene group, an alkyleneoxy group, and a polyalkyleneoxy group.

The alkylene group, the alkyleneoxy group, or the polyalkyleneoxy group preferably has 2 to 10 carbon atoms, more preferably 2 to 4 carbon atoms, and particularly preferably 2 carbon atoms. The alkylene group, the alkyleneoxy group, or the polyalkyleneoxy group may have a substituent, and examples of the substituent include an alkyl group, an aryl group, a halogen atom, and a hydroxy group.

Among these, the compound represented by Formula (2) is preferably phenoxyethyl (meth)acrylate, and particularly preferably phenoxyethyl acrylate.

The monofunctional monomer may contain an aromatic group-containing monofunctional (meth)acrylate compound other than a compound represented by (2). The cyclic structure of the aromatic group of the aromatic group-containing monofunctional (meth)acrylate compound may contain a heteroatom such as O, N, and S.

Examples of aromatic group-containing monofunctional (meth)acrylate compounds other than the compound represented by Formula (2) include 1-naphthyl (meth)acrylate, 2-naphthyl (meth)acrylate, 2-α-naphthyloxyethyl (meth)

acrylate, 2-β-naphthyloxyethyl (meth)acrylate, 2-anthryl (meth)acrylate, 9-anthryl (meth)acrylate, 1-phenanthryl (meth)acrylate, 2-phenanthryl (meth)acrylate, ethylene oxide-modified cresol (meth)acrylate (hereinafter "ethylene oxide" is also referred to as "EO"), p-nonylphenoxyethyl (meth)acrylate, p-nonylphenoxypolyethylene glycol (meth) acrylate, p-cumylphenoxyethylene glycol (meth)acrylate, 2-furyl (meth)acrylate, 2-furfuryl (meth)acrylate, 2-thienyl (meth)acrylate, 2-thenyl (meth)acrylate, 1-pyrrolyl (meth) acrylate, 2-pyridyl (meth)acrylate, 2-quinolyl (meth)acrylate, N-(1,1-dimethyl-2-phenyl)ethyl (meth)acrylamide, N-diphenylmethyl (meth)acrylamide, N-phthalimidemethyl (meth)acrylamide, and N-(1,1'-dimethyl-3-(1,2,4-triazol-1-yl))propyl (meth)acrylamide.

Furthermore, as the monofunctional (meth)acrylate monomer, a compound represented by the following formula (3) is also preferably used.

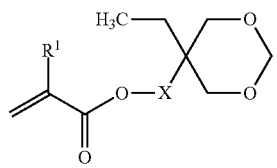
(3)

(In Formula (3), $R^1$ represents a hydrogen atom or a methyl group, and X represents a single bond or a divalent linking group.) The compound represented by Formula (3) may be an acrylate compound or a methacrylate compound, but it is preferable that it is an acrylate compound, that is, $R^1$ is a hydrogen atom.

The divalent linking group as X in Formula (3) is not particularly limited as long as the effects of the present invention are not greatly impaired, but is preferably a divalent hydrocarbon group or a divalent linking group formed by combining a hydrocarbon group and at least one bond selected from the group consisting of an ester bond, a urethane bond, a urea bond, an ether bond, and an amide bond.

X is preferably a divalent hydrocarbon group. The divalent hydrocarbon group is preferably a divalent hydrocarbon group having 1 to 20 carbon atoms, and more preferably a divalent hydrocarbon group having 1 to 5 carbon atoms; and among the hydrocarbon groups an alkylene group is preferable, and a methylene group, which has 1 carbon atom, is particularly preferable.

Furthermore, when X is a divalent linking group formed by combining a hydrocarbon group and at least one bond selected from the group consisting of an ester bond, a urethane bond, a urea bond, an ether bond, and an amide bond, the hydrocarbon group is preferably an alkylene group having 1 to 5 carbon atoms. It is preferably a divalent linking group formed by combining at least one alkylene group and at least one bond selected from the group consisting of an ester bond (—COO— or —OCO—), a urethane bond (—NRCOO— or —OCONR— (in which R represents a hydrogen atom or an alkyl group)), a urea bond (—NRCONR'— (in which R and R' represent a hydrogen atom or an alkyl group)), an ether bond (—O—), and an amide bond (—NRCO— or —CONR— (in which R represents a hydrogen atom or an alkyl group)). Among these, a divalent linking group formed by combining at least one alkylene group and at least one ether bond is more preferable.

The divalent linking group formed by combining an alkylene group and an ether bond is preferably *-(alkylene group)-O—** or *-(alkylene group)-O-(alkylene group)-** (in which * represents the site at which X and the O of the (meth)acryloxy group are bonded, and ** represents the site at which X and the quaternary carbon atom are bonded).

The divalent linking group formed by combining an alkylene group and an ether bond is preferably a poly(alkyleneoxy) group or poly(alkyleneoxy)alkyl group, which have a plurality of -(alkylene group)-O— moieties, and in this case the total number of carbon atoms in the linking group is preferably 1 to 60, and more preferably 1 to 20.

Specific preferred examples of the compound represented by Formula (3) include, but are not limited to, compounds (3-1) to (3-4) shown below.

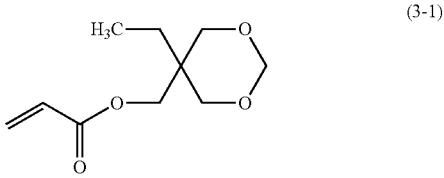
(3-1)

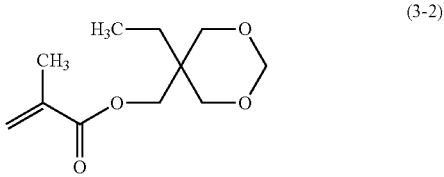
(3-2)

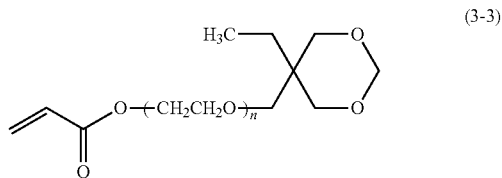
(3-3)

n = 1~30

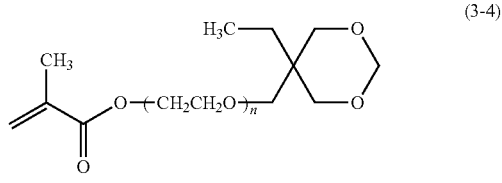
(3-4)

n = 1~30

Among these, cyclic trimethylolpropane formal acrylate (3-1) and cyclic trimethylolpropane formal methacrylate (3-2) are more preferable, and cyclic trimethylolpropane formal acrylate (3-1) is particularly preferable.

The components A-3 may be used alone or in combination of two or more kinds thereof as appropriate.

Another Polymerizable Compound (Component A-4)

The ink composition of the present embodiment may contain another polymerizable compound (component A-4) other than the component A-1, the component A-2, and the component A-3, and examples of the component A-4 include a radically polymerizable oligomer (component A-4-1).

Radically Polymerizable Oligomer (Component A-4-1)

The ink composition of the present embodiment may contain a radically polymerizable oligomer (Component A-4-1) as the polymerizable compound (component A). The oligomer as mentioned herein is a radically polymerizable compound having a molecular weight of more than 1,000, and preferably a polyfunctional oligomer containing a plurality, and preferably 2 to 4, of ethylenically unsaturated groups.

The radically polymerizable oligomer preferably contains an ethylenically unsaturated group at a molecular terminal or in a molecular side chain of an addition polymer having a finite number (usually 5 to 100) of constituent units, and its weight-average molecular weight is preferably more than 1,000 and 10,000 or less, and more preferably more than 1,000 and 5,000 or less.

The radically polymerizable oligomer preferably contains a plurality of (meth)acryloxy groups.

The radically polymerizable oligomer may be any oligomer formed of structural units constituting any monomer, and examples thereof include olefin-based oligomers (an ethylene oligomer, a propylene oligomer, a butene oligomer, and the like), a vinyl-based oligomer (a styrene oligomer, a vinyl alcohol oligomer, a vinylpyrrolidone oligomer, an acrylate oligomer, a methacrylate oligomer, and the like), diene-based oligomers (a butadiene oligomer, a chloroprene rubber, a pentadiene oligomer, and the like), ring-opening polymerization type oligomers (di-, tri-, tetra-ethylene glycol, polyethylene glycol, polyethylimine, and the like), addition-polymerization type oligomers (an oligoester acrylate, a polyamide oligomer, a polyisocyanate oligomer), and addition-condensation oligomers (a phenolic resin, an amino resin, a xylene resin, a ketone resin, and the like). Among these, oligoester (meth)acrylates are preferable, and among these, a urethane (meth)acrylate, a polyester (meth)acrylate, and an epoxy (meth)acrylate are more preferable, and a urethane (meth)acrylate is still more preferable.

Preferred examples of the urethane (meth)acrylate include an aliphatic urethane (meth)acrylate and an aromatic urethane (meth)acrylate, and more preferred examples thereof include an aliphatic urethane (meth)acrylate.

Furthermore, the urethane (meth)acrylate is preferably a di- to tetra-functional urethane (meth)acrylate, and more preferably a di-functional urethane (meth)acrylate.

By incorporating a urethane (meth)acrylate, an ink composition having favorable adhesion to a recording medium and favorable curability is obtained.

The content of the radically polymerizable oligomer in the ink composition is preferably less than 10% by mass, more preferably 5% by mass or less, and particularly preferably 0% by mass to 5% by mass.

Polymerization Initiator (Component B)

The ink composition of the present embodiment preferably contains a polymerization initiator (Component B), and it preferably contains an acylphosphine-based polymerization initiator (Component B-1) (hereinafter also referred to as an "acylphosphine compound") as Component B. Further, the ink composition may contain another polymerization initiator (Component B-2).

Acylphosphine-Based Polymerization Initiator (Component B-1)

The ink composition of the present embodiment contains an acylphosphine-based polymerization initiator (an acylphosphine compound) (Component B-1) as the polymerization initiator. By incorporating the component B-1, the curability is favorable, which is thus preferable.

The acylphosphine-based polymerization initiator (component B-1) is not particularly limited, and known compounds may be used. Preferred examples thereof include the acylphosphine oxide compounds described in paragraphs 0080 to 0098 of JP2009-96985A, and for example, preferred examples of the monoacylphosphine oxide compound include 2,4,6-trimethylbenzoyldiphenylphosphine oxide (DAROCURTPO, manufactured by BASF, LUCIRIN TPO, manufactured by BASF). Further, preferred examples of the bisacylphosphine oxide compound include bis(2,4,6-trimethylbenzoyl)phenylphosphine oxide (IRGACURE 819, manufactured by BASF Japan Ltd.).

Other Polymerization Initiator (Component B-2)

Examples of the other polymerization initiator include an α-aminoalkylphenone compound, an aromatic ketone, an aromatic onium salt compound, an organic peroxide, a thio compound, a hexaarylbiimidazole compound, a ketoxime ester compound, a borate compound, an azinium compound, a metallocene compound, an active ester compound, and a compound having a carbon halogen bond.

As the other polymerization initiator, a known polymerization initiator other than the component B-1, preferably a radical polymerization initiator, may be used, and examples thereof include those described in paragraphs 0090 to 0116 of JP2009-185186A. Further, as the other polymerization initiator, a thioxanthone compound, or a thiochromanone compound may be used, and examples include compounds described in paragraphs 0064 to 0068 of JP2010-126644A.

Further, the polymerization initiator in the present embodiment includes not only a compound that generates a polymerization-initiating species by absorbing external energy such as actinic radiation but also a compound that promotes decomposition of a polymerization initiator by absorbing specific actinic energy rays (a so-called sensitizer).

The ink composition of the present embodiment may use a known sensitizer as a polymerization initiator other than the component B-1. Examples of the sensitizer include a polynuclear aromatic compound (for example, pyrene, perylene, triphenylene, and 2-ethyl-9,10-dimethoxyanthracene), a xanthene (for example, fluorescein, eosin, erythrosine, Rhodamine B, and Rose Bengal), a cyanine (for example, thiacarbocyanine and oxacarbocyanine), a merocyanine (for example, merocyanine and carbomerocyanine), a thiazine (for example, thionine, methylene blue, and toluidine blue), an acridine (for example, acridine orange, chloroflavine, and acriflavine), an anthraquinone (for example, anthraquinone), a squarium (for example, squarium), and a coumarin (for example, 7-diethylamino-4-methylcoumarin). Further, the sensitizers may be used singly or in combination of two or more kinds thereof.

From the viewpoint of curability and hue of a cured film the content of the polymerization initiators, including the component B-1, in the ink composition of the present embodiment is preferably from 1.5% by mass to 30% by mass, more preferably from 2% by mass to 26% by mass, still more preferably from 5% by mass to 22% by mass, and particularly preferably from 10% by mass to 18% by mass, with respect to the total mass of the ink composition.

Surface Tension Adjusting Agent (Component C)

The ink composition of the present embodiment may contain a surface tension adjusting agent (component C). The surface tension adjusting agent as mentioned herein is not particularly limited as long as it is a compound that has the function of lowering the surface tension of the ink composition, and it preferably contains a silicone compound containing an ethylenically unsaturated double bond in the molecule (component C-1) as the surface tension adjusting agent (component C).

Silicone Compound Containing Ethylenically Unsaturated Double Bond in Molecule (Component C-1)

The ink composition of the present embodiment preferably contains a silicone compound containing an ethylenically unsaturated double bond in the molecule (component C-1) (hereinafter also referred to as a "polymerizable silicone compound") as the component C. Further, the polymerizable silicone compound is a compound containing an ethylenically unsaturated double bond and a silicone chain.

Examples of a group having an ethylenically unsaturated double bond include an acryloxy group, a methacryloxy group, a vinyl group, an N-vinyl group, an acrylamide group, and an allyl group. Among these, an acryloxy group, a methacryloxy group, a vinyl group, and an allyl group are preferable, and a methacryloxy group and an allyl group are more preferable. Using a compound having the group having an ethylenically unsaturated double bond, an ink composition having favorable anti-blocking properties and favorable stretchability for a cured film is obtained.

With regard to the ethylenically unsaturated double bond possessed by the polymerizable silicone compound, there may be only one type, or two or more different types may be used in combination.

Furthermore, it is preferable for the number of ethylenically unsaturated double bonds in the molecule to be 2 or more, more preferably 4 or more, still more preferably 6 or more, and particularly preferably 10 or more. Due to there being a large number of functional groups, the hardness of the outermost surface of the coating increases, and good surface curability and anti-blocking properties are obtained.

In the present embodiment, as the polymerizable silicone compound, the commercial materials below may be used.

EVERCRYL 350 and EVERCRYL 4842 (both manufactured by UCB Chemicals Corporation), PERENOL S-5 (manufactured by Cognis), RC149, RC300, RC450, RC709, RC710, RC711, RC720, and RC802 (all manufactured by Goldschmidt Chemical Corporation), FM0711, FM0721, FM0725, and PS583 (all manufactured by Chisso Corporation), KP-600, X-22-164, X-22-164AS, X-22-164A, X-22-164B, X-22-164C, and X-22-164E (all manufactured by Shin-Etsu Chemical Co., Ltd.), BYK UV3500, BYK UV3570, and BYK Silclean 3700 (all manufactured by BYK Chemie), TEGO Rad 2100, TEGO Rad 2200N, TEGO Rad 2250N, TEGO Rad 2300, TEGO Rad 2500, TEGO Rad 2600, and TEGO Rad 2700 (all manufactured by Degussa), and DMS-V00, DMS-V03, DMS-V05, DMS-V21, DMS-V22, DMS-V25, DMS-V25R, DMS-V31, DMS-V33, DMS-V35, DMS-V41, DMS-V42, DMS-V46, DMS-V52, DMS-V25R, DMS-V35R, PDV-0325, PDV 0331, PDV 0341, PDV 0346, PDV 0525, PDV 0541, PDV 1625, PDV 1625, PDV 1631, PDV 1635, PDV 1641, PDV 2331, PDV 2335, PMV-9925, PVV-3522, FMV-4031, EDV-2025, VDT-123, VDT-127, VDT-131, VDT-153, VDT-431, VDT-731, VDT-954, VDS-2513, VDV-0131, VGM-021, VGP-061, VGF-991, VQM-135, VQM-146, VQX-221, VMS-005, VMS-T11, VTT-106, MTV-124, VAT-4326, VBT-1323, VPT-1323, VMM-010, VEE-005, and VPE-005 (all manufactured by Gelest, Inc.).

In the present embodiment, the proportion of the polymerizable silicone compound in the ink composition is preferably from 0.01% by mass to 10.0% by mass, more preferably from 0.05% by mass to 5.0% by mass, and still more preferably from 0.1% by mass to 3.0% by mass, with respect to the entire amount of the ink composition.

Furthermore, the polymerizable silicone compound also corresponds to the polymerizable compound (component A). Therefore, for the preferred total amount and the like of the (component A), the polymerizable silicone compound is considered.

Surfactant (Component C-2)

The ink composition of the present embodiment may contain a surfactant (component C-2) as the surface tension adjusting agent (component C) in order to impart discharge properties that are stable for a long period of time.

Examples of the surfactant include a silicone-based surfactant (excluding a silicone compound containing an ethylenically unsaturated double bond in the molecule), a fluorine-based surfactant, and other surfactants.

Moreover, examples of surfactants other than silicone-based and fluorine-based surfactants include those described in each of JP1987-173463A (JP-S62-173463A) and JP1987-183457 (JP-S62-183457A). Examples thereof include anionic surfactants such as dialkyl sulfosuccinates, alkylnaphthalene sulfonates, and fatty acid salts; nonionic surfactants such as polyoxyethylene alkyl ethers, polyoxyethylene alkyl allyl ethers, acetylene glycols, and polyoxyethylene-polyoxypropylene block copolymers; and cationic surfactants such as alkylamine salts and quaternary ammonium salts.

Polymerization Inhibitor (Component D)

The ink composition of the present embodiment may contain an oxyl free radical-based polymerization inhibitor (component D-1), a phenol-based polymerization inhibitor (component D-2), an amine-based polymerization inhibitor (component D-3), and other polymerization inhibitors (component D-4) as the polymerization inhibitor (component D).

Oxyl Free Radical-Based Polymerization Inhibitor (Component D-1)

The ink composition of the present embodiment contains (Component D-1) an oxyl free radical-based polymerization inhibitor. The oxyl free radical-based polymerization inhibitor is not particularly limited as long as it contains an oxyl free radical (—O.) in the molecule and has a polymerization inhibition function, but the oxyl free radical is preferably an azo oxyl free radical (>N—O.). The component D-1 is preferably a compound represented by the following formula (4-1).

(4-1)

In Formula (4-1), W represents a cyclic alkylene chain having 4 or 5 carbon atoms, and the cyclic alkylene chain may have a substituent.

The compound represented by Formula (4-1) is preferably a compound represented by Formula (4-2).

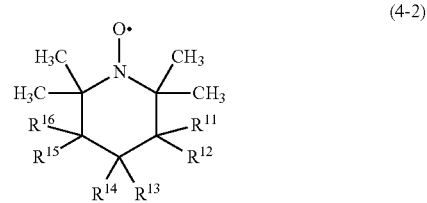

(4-2)

In Formula (4-2), $R^{11}$ to $R^{16}$ each independently represent a hydrogen atom, a halogen atom, or a monovalent organic group, or $R^{11}$ and $R^{12}$, $R^{13}$ and $R^{14}$, $R^{15}$ and $R^{16}$ may form one carbonyl group together with carbon to which these are bonded.

Phenol-Based Polymerization Inhibitor (Component D-2)

In the present embodiment, the phenol-based polymerization inhibitor refers to a phenol group-containing compound, but is not otherwise limited. As the phenol-based polymerization inhibitor, known compounds may be used and are not limited, but a compound represented by Formula (5) is preferable.

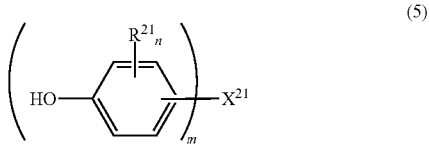

(5)

In Formula (5), m represents an integer of 1 to 5, n represents an integer of 1 to 4, the n $R^{21}$'s independently denote a hydrogen atom, a halogen atom (a fluorine atom, a chlorine atom, a bromine atom, or an iodine atom), a cyano group, a hydroxy group, an optionally branched alkyl group having 1 to 20 carbon atoms, a cycloalkyl group having 3 to 8 carbon atoms, an aryl group having 6 to 12 carbon atoms, an alkenyl group having 1 to 5 carbon atoms, or an alkynyl group having 1 to 5 carbon atoms; these groups may be bonded to a benzene ring shown in Formula (5) via a linking group, and examples of the linking group include a carbonyl group, a carbonyloxy group (—COO—), an oxycarbonyl group (—OCO—), a thio group, a sulfonyl group, a sulfinyl group, an oxy group, an amino group (—NH—), an amide group, an alkylene group having 1 to 6 carbon atoms, an arylene group having 6 to 12 carbon atoms, a phosphonic acid ester group, a phosphoric acid ester group, a 3- to 8-membered polyvalent heterocyclic group formed by removing two or more hydrogen atoms from a hetero ring such as triazine or dioxane, an alkylamino group, and a polyvalent linking group selected from combinations of these linking groups. Further, two or more groups represented by $R^{21}$ may be bonded to each other to form a ring structure.

The group represented by $R^{21}$ may have a substituent at a carbon atom for which introduction is possible. Examples of the substituent that can be introduced include an alkyl group having 1 to 6 carbon atoms, a hydroxy group, a cyano group, a halogen atom (a fluorine atom, a chlorine atom, a bromine atom, or an iodine atom), an amino group, an alkylamino group, an alkoxy group, and a (meth)acryloyl group.

$X^{21}$ represents an m-valent linking group when m is two or greater, and specific examples include a single bond, a carbonyl group, a carbonyloxy group, a thio group, a sulfonyl group, a sulfinyl group, an oxy group, a phosphonic acid ester group, an alkylene group having 1 to 6 carbon atoms, an arylene group having 6 to 12 carbon atoms, an amino group, an aliphatic hydrocarbon group having 1 to 6 carbon atoms from which m hydrogen atoms have been removed, an m-valent aromatic hydrocarbon group having 6 to 12 carbon atoms from which m hydrogen atoms have been removed, a 6- to 12-membered heterocyclic group in which m hydrogen atoms have been removed from a hetero ring such as triazine or dioxane, and a combination of these linking groups, and as for $R^{21}$, it may have the substituent at a carbon atom for which introduction is possible.

Needless to say, when m in Formula (B-2-1) is 1, that is, when it is a compound having only one structure represented by Formula (B-2-1), it does not have a linking group $X^{21}$. In this case, it may have a monovalent substituent instead of $X^{21}$; examples of the monovalent substituent include the same groups as for $R^{21}$, and it may be bonded to substituted $R^{21}$ on the benzene ring to form a ring structure, or may be bonded to the benzene ring via a linking group.

Amine-Based Polymerization Inhibitor (Component D-3)

The ink composition of the present embodiment may contain an amine-based polymerization inhibitor (component D-3) as the polymerization inhibitor (component D). The component D-3 is not particularly limited as long as it is a compound having one or more amine moieties in the molecule and having a polymerization inhibition function; and examples thereof include an aromatic amine-based polymerization inhibitor and a hindered amine-based polymerization inhibitor, and a hindered amine-based polymerization inhibitor is preferable.

Examples of the aromatic amine-based polymerization inhibitor include p-phenylenediamines such as p-phenylenediamine, N,N'-di-diisopropyl-p-phenylenediamine, N,N'-di-sec-butyl-p-phenylenediamine, N,N'-diphenyl-p-phenylenediamine, and N-(1-methylheptyl)-p-phenylenediamine; and secondary amines such as 4,4'-dicumyl-diphenylamine, 4,4'-dioctyl-diphenylamine, p-methoxyphenylmethylamine, 4,4'-dinonyldiphenylamine, diphenylamine, phenyl-α-naphthylamine, and phenyl-β-naphthylamine.

The hindered amine-based polymerization inhibitor is not particularly limited as long as it is an amine compound having a moiety with a hindered amine structure (a structure in which there is steric hindrance with respect to a basic nitrogen atom) in the molecule, and a known hindered amine-based polymerization inhibitor may be used. In the present embodiment, aliphatic hindered amine-based polymerization inhibitors are preferably used.

Other Polymerization Inhibitors (Component B-4)

Other polymerization inhibitors (component B-4) may be contained as the other polymerization inhibitor (component B). The component B-4 is not particularly limited as long as it is a polymerization inhibitor other than the components B-1 to B-3, and examples thereof include a nitroso-based polymerization inhibitor and a phosphite ester-based polymerization inhibitor.

Examples of the nitroso-based polymerization inhibitor include 1-nitroso-2-naphthol, 2-nitroso-1-naphthol, nitrosobenzene, and FIRSTCURE ST-1 (tris(N-nitroso-N-phenylhydroxylamine)ammonium salt, manufactured by Alvemarle). Examples of the phosphite ester-based polymerization inhibitor include triphenyl phosphite, tris(nonylphenyl phosphite), triethyl phosphite, tris(2-ethylhexyl)phosphite, tridecyl phosphite, tris(tridecyl)phosphite, diphenylmono(2-ethylhexyl)phosphite, diphenylmonodecyl phosphite, diphenylmono(tridecyl)phosphite, dilauryl hydrogen phosphite, tetraphenyldipropylene glycol diphosphite, tetraphenyltetra(tridecyl)pentaerythritol tetraphosphite, tetra(tridecyl)-4,4'-isopropylidenediphenyl diphosphite, trilauryl trithiophosphite, bis(tridecyl)pentaerythritol diphosphite, tristearyl phosphite, distearylpentaerythritol diphosphite, bis(nonylphenyl)pentaerythritol diphosphite, and tris(2,4-di-t-butylphenyl)phosphite.

In the present embodiment, the content of the polymerization inhibitors (component D) is preferably in the range of 0.05% to 2% of the total ink composition. If the total of the components B is within the range above, the storage stability and the curability are favorable.

Colorant (Component E)

The colorant that can be used in the present invention is not particularly limited, but a pigment and an oil-soluble dye that have favorable weather resistance and rich color reproduction are preferable, and it may be selected from any known coloring agent such as a soluble dye. It is preferable that the colorant does not function as a polymerization inhibitor in a polymerization reaction, which is a curing reaction. This is because the sensitivity of the curing reaction by actinic radiation should not be degraded.

(Pigment)

The pigment is not particularly limited and as the pigment, for example, organic and inorganic pigments having the numbers below described in the Color Index may be used.

That is, as a red or magenta pigment, Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36; as a blue or cyan pigment, Pigment Blue 1, 15, 15:1, 15:2, 15:3, 15:4, 15:6, 16, 17-1, 22, 27, 28, 29, 36, or 60; as a green pigment, Pigment Green 7, 26, 36, or 50; as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193; as a black pigment, Pigment Black 7, 28, or 26; as a white pigment, Pigment White 6, 18, or 21, and the like may be used according to the intended application.

(Oil-Soluble Dye)

The oil-soluble dye that can be used in the present embodiment means a dye that is substantially insoluble in water. Specifically, the solubility in water at 25° C. (the mass of dye that can be dissolved in 100 g of water) is 1 g or less, preferably 0.5 g or less, and more preferably 0.1 g or less. Therefore, the oil-soluble dye means a so-called water-insoluble pigment or an oil-soluble dye, and among these, the oil-soluble dye is preferable.

Among the oil-soluble dyes that can be used in the present embodiment, as a yellow dye, any may be used. Examples thereof include aryl or heteryl azo dyes having a coupling component such as a phenol, a naphthol, an aniline, a pyrazolone, a pyridone, and an open-chain active methylene compound; azomethine dyes having a coupling component such as an open-chain active methylene compound; methine dyes such as benzylidene dyes and monomethineoxonol dyes; quinone dyes such as naphthoquinone dyes and anthraquinone dyes; and other dye species such as quinophthalone dyes, nitro/nitroso dyes, acridine dyes, and acridinone dyes.

Among the above-mentioned oil-soluble dyes that can be used in the present embodiment, as a magenta dye, any may be used. Examples thereof include aryl or heteryl azo dyes having a coupling component such as a phenol, a naphthol, and an aniline; azomethine dyes having a coupling component such as a pyrazolone and a pyrazolotriazole; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, and anthrapyridones; and condensed polycyclic dyes such as dioxazine dyes.

Among the oil-soluble dyes that can be used in the present embodiment, as a cyan dye, any may be used. Examples thereof include indoaniline dyes, indophenol dyes, and azomethine dyes having a coupling component such as a pyrrolotriazole; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having a coupling component such as a phenol, a naphthol, and an aniline; and indigo/thioindigo dyes.

The respective dyes may be dyes that exhibit respective colors of yellow, magenta, and cyan only after a part of the chromophore dissociates, and in that case the counter cation may be an inorganic cation such as an alkali metal or ammonium, may be an organic cation such as pyridinium or a quaternary ammonium salt, or may be a polymer cation having the above cation as a partial structure.

Preferred specific examples thereof include, but not limited to, C. I. Solvent Black 3, 7, 27, 29, and 34; C. I. Solvent Yellow 14, 16, 19, 29, 30, 56, 82, 93, and 162; C. I. Solvent Red 1, 3, 8, 18, 24, 27, 43, 49, 51, 72, 73, 109, 122, 132, and 218; C. I. Solvent Violet 3; C. I. Solvent Blue 2, 11, 25, 35, 38, 67, and 70; C. I. Solvent Green 3 and 7; and C. I. Solvent Orange 2.

Particularly preferred examples thereof include Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (manufactured by Orient Chemical Industries, Ltd.), Aizen Spilon Blue GNH (manufactured by Hodogaya Chemical Co., Ltd.), and Neopen Yellow 075, Neopen Magenta SE1378, Neopen Blue 808, Neopen Blue FF4012, and Neopen Cyan FF4238 (manufactured by BASF).

In the present embodiment, the oil soluble dye may be used singly or in combination of two or more kinds thereof.

Furthermore, when the oil soluble dye is used as a colorant, another colorant such as a water-soluble dye, a disperse dye, or a pigment may be contained as necessary in a range that does not interfere with the effects of the present embodiment.

Moreover, a disperse dye may be used in a range that enables it to be dissolved in a water-immiscible organic solvent. Disperse dyes generally include water-soluble dyes, but in the present embodiment, it is preferable for the disperse dye to be used in a range such that it dissolves in a water-immiscible organic solvent. Specific preferred examples of the disperse dye include C. I. Disperse Yellow 5, 42, 54, 64, 79, 82, 83, 93, 99, 100, 119, 122, 124, 126, 160, 184:1, 186, 198, 199, 201, 204, 224, and 237; C. I. Disperse Orange 13, 29, 31:1, 33, 49, 54, 55, 66, 73, 118, 119, and 163; C. I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; C. I. Disperse Violet 33; C. I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and C. I. Disperse Green 6:1 and 9.

It is preferable that the colorant is added to the ink composition and then dispersed in the ink composition to an appropriate degree. For dispersion of the colorant, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

The colorant may be blended into the ink composition with the respective components by the direct addition during the preparation of the ink composition, but in order to improve dispersibility, the colorant may be added in advance to a solvent or a dispersing medium such as a radically polymerizable compound used in the present embodiment.

In the present invention, in order to avoid the problem of the solvent resistance being degraded when the solvent remains in the cured image and problems with the Volatile Organic Compound (VOC) of the residual solvent, it is preferable to add and blend the colorant in advance into a dispersing medium such as a radically polymerizable compound. As a polymerizable compound used in the addition of the colorant, it is preferable in terms of dispersion suitability to select a monomer having low viscosity.

These colorants may be used by appropriately selecting one type or two or more kinds according to the intended purpose of the ink composition.

Further, when a colorant such as a pigment, which is present as a solid in the ink composition, is intended to be used, the DV90 of the colorant particles is 500 nm or less. By setting the DV90 of the colorant particles to 500 nm or less, the flying astray at a time of discharge from the nozzles is prevented, whereby it is possible to improve uniformity of the change in the astray speeds. Accordingly, an image having good color reproductivity in the halftone region and granularity can be formed. The particle diameter of the colorant particle can be controlled by a milling time at a time of pigment formation and the redispersion time at a time of ink formation. Further, the milling time at a time of pigment formation is a time taken for dispersion using a Motor Mill M50 disperser (manufactured by Eiger Machinery, Inc.) with zirconia beads having a diameter of 0.65 mm at a peripheral speed of 9 m/s, and the redispersion time at a time of ink formation is a time taken for stirring using Silversion L5 (manufactured by Silverson) at a stirring speed of 5000 rpm.

The content of the colorant in the ink composition is selected appropriately according to the color and the intended purpose, but it is preferably from 0.01% by mass to 30% by mass of the total mass of the ink composition.

Dispersant (Component F)

The ink composition preferably contains a dispersant (component F). As the dispersant, a polymeric dispersant is preferable. Further, the "polymeric dispersant" in the present embodiment means a dispersant having a mass average molecular weight of 1,000 or more.

Examples of the polymeric dispersant include polymeric dispersants such as DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (manufactured by EFKA Additives B. V.); Disperse Aid 6, Disperse Aid 8, Disperse Aid 15, and Disperse Aid 9100 (manufactured by San Nopco Ltd.); various types of SOLSPERSE dispersants such as Solsperse 3000, 5000, 9000, 12000, 13240, 13940, 17000, 22000, 24000, 26000, 28000, 32000, 36000, 39000, 41000, and 71000 (manufactured by Noveon); Adeka Pluronic L31, F38, L42, L44, L61, L64, F68, L72, P95, F77, P84, F87, P94, L101, P103, F108, L121, and P-123 (manufactured by Adeka Corporation); Ionet S-20 (manufactured by Sanyo Chemical Industries, Ltd.); and Disparlon KS-860, 873SN, and 874 (polymeric dispersant); #2150 (aliphatic poly carboxylic acid) and #7004 (polyether ester type) (manufactured by Kusumoto Chemicals, Ltd.).

The content of the dispersant in the ink composition is appropriately selected according to the intended purpose, and is preferably from 0.05% by mass to 15% by mass with respect to the total mass of the ink composition.

Hereinbelow, the technical scope of the present invention is not limited to the scope described in the embodiments. The configurations and the like in the respective embodiments may be appropriately combined within a range departing from the spirit of the present invention.

EXAMPLES

The present embodiments will be described below more specifically by reference to Examples and Comparative Examples. Further, "part(s)" in the description below means "part(s) by mass" unless otherwise specified.

Materials used in the present Examples are as shown below.

<Polymerizable Compounds>

NVC: N-vinyl caprolactam (V-CAP, manufactured by ISP)

PEA: phenoxyethylacrylate (SR339, manufactured by Sartomer)

EOTMPTA: ethylene oxide-modified trimethylol propanetriacrylate (manufactured by Sartomer, SR-454)

CTFA: cyclictrimethylol propane formalacrylate (SR531, manufactured by Sartomer)

IBOA: isobornylacrylate (SR506, manufactured by Sartomer)

DPGDA: dipropylene glycol diacrylate (manufactured by Daicel-Cytec Company Ltd.)

<Polymerization Initiators>

IRGACURE819: bis(2,4,6-trimethylbenzoyl)-phenylphosphine oxide (manufactured by BASF Japan Ltd.)

DAROCUR TPO: bis(2,6-dimethoxy benzoyl)-2,4,4-trimethylpentylphenylphosphine oxide, 2,4,6-trimethylbenzoyl-diphenyl-phosphine oxide (manufactured by BASF Japan Ltd.)

IRGACURE184: 1-hydroxycyclohexylphenylketone (manufactured by BASF Japan Ltd.)

ITX: isopropylthioxanthone (SPEEDCURE ITX, manufactured by LAMBSON)

DETX: 2,4-diethylthioxanthone (KAYACURE DETX, manufactured by Nippon Kayaku Co., Ltd.)

<Mill Bases>

(Pigment)

INKJET YELLOW 4GC: (yellow pigment, manufactured by Clariant International Ltd.)

CINQUASIA MAGENTA RT-355-D: (magenta pigment, manufactured by Ciba Specialty Chemicals K. K. Japan)

IRGALITE BLUE GLVO: IRGALITTE BLUE GLVO (cyan pigment, manufactured by Ciba Specialty Chemicals K. K.)

SPCIAL BLACK 250: (black pigment, manufactured by Ciba Specialty Chemicals K. K. Japan)

(Solvent)

NPGPODA: PO-modified neopentyl glycol diacrylate (manufactured by Sartomer Company, Inc.)

(Dispersants)

SOLSPERSE32000 (manufactured by Noveon)

SOLSPERSE41000 (manufactured by Noveon) (polymerization inhibitor)

FIRSTCURE ST-1 (a mixture of tris(N-nitroso-N-phenylhydroxyamine)aluminum salt (10% by mass) and phenoxyethylacrylate (90% by mass), manufactured by Chem First)

<Oligomer>

CN964A85: urethane acrylate oligomer, average number of functional groups of 2, manufactured by Sartomer Japan Inc.)

[Preparation of Mill Base]

The components in the blending amounts described in FIG. 12 were stirred and mixed to obtain mill bases in the respective colors. Preparation of the mill base was carried out by putting the components into a Motor Mill M50 disperser (manufacture by Eiger Machinery, Inc.) using zirconia beads having a diameter of 0.65 mm at a peripheral speed of 9 m/s for the millling time in FIGS. 13 to 19 to afford the same particle diameters, and the dispersion was carried out during the redispersion time.

EXAMPLES AND COMPARATIVE EXAMPLES

Method for Preparing Ink Composition

The respective materials described in FIGS. 13 to 19 were mixed and stirred in the amounts described in FIGS. 13 to 19 to obtain ink compositions of Examples 1 to 10 and Comparative Examples 1 and 2.

<Particle Diameter>

The average value and DV90 of the pigment particle diameters were measured a density particle diameter analyzer FPAR-1000 (manufactured by Otsuka Electronics Co., Ltd.).

<Inkjet Recording Method>

Formation of an image was carried out using the inkjet recording apparatus 10 described in FIG. 7. Further, in the present Examples and Comparative Examples, nozzle arrays 61CL and nozzle arrays 61W were not used. In addition, in the configuration of the inkjet head 24 shown in FIG. 9, absence of the head shift in Comparative Example 2 was generated using an inkjet head in which the respective nozzles of the nozzle arrays 61LM, 61K, 61C, 61M, 61Y, and 61LC are arranged in the same position in the X direction. Further, as the recording medium, UV Gloss Coat 157 (product number of UVGC760) manufactured by SAKURAI Co., Ltd. was used.

<Evaluation>

For the image formed, the evaluations of the gloss unevenness, the stickiness, the flexibility, and the productivity were carried out according to the following criteria.

<Evaluation of Gloss Unevenness>

For the gloss unevenness, it was confirmed whether there is unevenness similar to a trace caused by cutting grass of a golf course by carrying out by stepwise evaluation by a sensory evaluation with a visual test.

5: In neither a long distance (a distance of 2 m) nor a short distance (hand-held distance), gloss unevenness is not observed.

4: A level in which gloss unevenness cannot be observed in a long distance, but slight unevenness is sensed at an observation angle with a short distance.

3: A level having no problem in practical use, in which gloss unevenness cannot be observed in a long distance, but unevenness is sensed at a certain observation angle with a short distance.

2: A level having a problem with a concern about practical use, in which slight gloss unevenness can be observed even in a long distance and slight unevenness is sensed in a short distance.

1: A level not acceptable for practical use, in which gloss unevenness can be observed even in a long distance.

<Evaluation of Stickiness>

The curability of an ink was subjected to sensory stepwise evaluation actually by palpation, from the stickiness on the surface of a printed material.

5: a level in which there is no stickiness in an image.

4: a level having no problem in practical use, in which very slight stickiness is sensed in an image, but even in the case of images are stacked (100 sheets), pasting or the like does not occur.

3: a level having no problem in practical use, in which slight stickiness is sensed in an image, but in the case of images are stacked (100 sheets), transfer or the like does not occur.

2: a level having a problem in practical use, in which stickiness is sensed in an image, and in the case of images are stacked (100 sheets), a peeling sound occurs at a time of peeling; and depending on a substrate (for example, a coating paper), transfer partially occurs on the surface of an image.

1: a level having a problem in practical use, in which an image is sticky and slightly slippery, and in the case of images are stacked (100 sheets), a loud peeling sound occurs at a time of peeling a printed material; and depending on a substrate (for example, a coating paper), transfer partially occurs on a wide range of an image surface.

<Evaluation of Flexibility>

The flexibility was evaluated based on the following criteria, using PVC (LAG Mount P-280RW, manufactured by Lintec Co., Ltd.) as a recording medium. Further, the present substrate serves as a seal base material, and is used by being pasted onto various locations such as outdoor advertisements and train advertisements.

5: A level in which at a time of a pasting operation, the ink image is favorable in flexibility and there is no occurrence of complete cracks on an image.

4: A level having no problem in practical use, in which at a time of a pasting operation, there is occurrence of very slight cracks in a high-density region in composite colors of 3-color gray (3CG) including CMY and a 4-color gray (4CG) including CMYK, with a high amount of an ink.

3: A level having no problem in practical use, in which at a time of a pasting operation, there is occurrence of slight cracks in a medium- to high-density region in composite colors of 3-color gray (3CG) including CMY and a 4-color gray (4CG) including CMYK, with a high amount of an ink.

2: A level having a problem in practical use, in which at a time of a pasting operation, there is occurrence of cracks in a medium- to high-density region in a single color (Y, M, C, K), with a relatively small amount of an ink; and cracks in a low-density portion in composite colors, with a high amount of an ink.

1: A level not acceptable for practical use, in which at a time of a pasting operation, there is occurrence of cracks even in a low-density region in a single color (Y, M, C, or K), with a relatively small amount of an ink.

<Evaluation of Productivity>

The productivity is determined under a printing condition, such as a shuttle scan speed, a resolution, the number of passes, and a print direction (uni-directional printing or bi-directional printing). In the present Example, by changing the shuttle scanning speeds in a bi-directional printing mode with a resolution of 600×500 dpi and 10 passes, an area printable per unit time is defined as productivity. The area printable per unit time is subjected to a sensory evaluation as follows.

5: 30 $m^2$ or more per hour.
4: 25 $m^2$ to 30 $m^2$ per hour.
3: 15 $m^2$ to 25 $m^2$ per hour.
2: 10 $m^2$ to 15 $m^2$ per hour.
1: Less than 10 $m^2$ per hour.

<Results>

In Example 4, the gloss unevenness, the stickiness, the flexibility, and the productivity were all evaluated to be good. That is, an embodiment in which the content of NVC is about 15%, the pigment particle diameter (DV90) is about 300 nm, and a shuttle scanning speed (scanning speed in the main scanning direction of the inkjet head 24) is 1.2 m/s is best.

In contrast, in Examples 1, 2, and 3, and Comparative Examples 1 and 2, in which the amount of NVC is 24%, the flexibility was evaluated to be low. Further, in Comparative Example 1 in which the pigment particle diameter (DV90) is 500 nm or more, the pigment particle diameter is large, and thus, the discharge curve occurred and the gloss unevenness occurred.

For Examples 3 and 6 in which the shuttle scanning speed is 1 m/sec, the productivity was low, as compared with Examples in which the shuttle scanning speed is 1.2 m/sec, but the productivity was at a level having no problem in practical use.

As compared with Example 4, in Example 5 in which the pigment particle diameter (DV90) was 450 nm, the gloss unevenness was slightly reduced, but was still good.

As compared with Example 4, in Example 10 in which the content of NVC was 8%, the stickiness was increased, but was still good. In addition, in Example 7 in which the content of NVC was 5% and Example 9 in which the content of NVC was 3%, the stickiness was increased, but was still at a level having no problem in practical use.

As such, if the content of NVC is reduced, curing hardly occurs, the content of NVC is preferably in the range of 10% to 15% from the viewpoints of flexibility and stickiness.

In addition, as compared with Example 7, in Example 8 in which the shuttle scanning speed was 2 m/sec, gloss unevenness was increased, but was still at a level having no problem. Further, since the amount of ultraviolet rays irradiated from a curing light source is decreased as the shuttle scanning speed is increased, the stickiness was increased, but was still at a level having no problem.

Comparative Example 2 in which head shift was not carried out, the gloss unevenness was significantly increased, but in Example 2 in which head shift was carried out with the same composition, the gloss unevenness was improved. It could be confirmed that by carrying out head shift, the gloss unevenness can be improved.

What is claimed is:

1. An inkjet recording apparatus comprising:
    an inkjet head which has nozzle arrays having nozzles each of which discharges a curable ink cured by applied active energy and which are arranged in a first direction at a pitch P, the nozzle arrays being N nozzle arrays with N≥4 of every color, which respectively discharge thick inks of at least four colors including cyan, magenta, yellow, and black, and the nozzle arrays being arranged to be shifted by P/N away from each other in the first direction;
    an active energy imparting device configured to impart the active energy to ink droplets discharged from the nozzles and jetted on a recording surface of a recording medium;
    a retention device configured to dispose and retain the inkjet head and the active energy imparting device along a second direction that is orthogonal to the first direction;
    a scanning device configured to cause the retention device and the recording medium to relatively scan at a speed of equal to or more than 0.9 m/s in the second direction;
    a movement device configured to cause the retention device and the recording medium to relatively move in the first direction in every scanning action by the scanning device; and
    a control device configured to cause an image to be formed on the recording surface of the recording medium while causing the inkjet head and the active energy imparting device retained by the retention device to relatively scan each region of the recording medium plural times,
    wherein the curable ink includes an ink pigment and a polymerizable compound containing at least an N-vinyl lactam, the 90% diameter in cumulative volume distribution of the particle diameters of the ink pigment is equal to or less than 500 nm, and the content of N-vinyl lactam is 3% to 24%.

2. The inkjet recording apparatus according to claim 1, wherein the N-vinyl lactam is N-vinyl caprolactam.

3. The inkjet recording apparatus according to claim 2, wherein the control device forms an image at a discharge frequency of the inkjet head of equal to or more than 10 kHz.

4. The inkjet recording apparatus according to claim 3, wherein the curable ink contains a compound having a sensitizing effect with respect to an active energy ray at a wavelength of 300 nm to 450 nm.

5. The inkjet recording apparatus according to claim 2, wherein the curable ink contains a compound having a sensitizing effect with respect to an active energy ray at a wavelength of 300 nm to 450 nm.

6. The inkjet recording apparatus according to claim 1, wherein the control device forms an image at a discharge frequency of the inkjet head of equal to or more than 10 kHz.

7. The inkjet recording apparatus according to claim 6, wherein the curable ink contains a compound having a sensitizing effect with respect to an active energy ray at a wavelength of 300 nm to 450 nm.

8. The inkjet recording apparatus according to claim 1, wherein the curable ink contains a compound having a sensitizing effect with respect to an active energy ray at a wavelength of 300 nm to 450 nm.

9. The inkjet recording apparatus according to claim 1, wherein in the inkjet head, the nozzle of the curable ink having lowest curing sensitivity is arranged on a most upstream side in a direction of movement of the recording medium relative to the inkjet head, and
    wherein the control device causes an image to be formed on the recording surface of the recording medium in such a manner that the curable inks of the nozzles which are arranged on a more upstream side in the direction of the relative movement of the recording medium are disposed on a layer closer to the recording surface of the recording medium.

10. The inkjet recording apparatus according to claim 9, wherein the curable ink having the lowest curing sensitivity is the black curable ink.

11. The inkjet recording apparatus according to claim 9, wherein the respective nozzle arrays of the inkjet head are configured in such a manner that a nozzle of a curable ink having second lowest curing sensitivity is arranged subsequent to the nozzle of the curable ink having the lowest curing sensitivity from upstream side in the direction of the movement of the recording medium relative to the inkjet head.

12. The inkjet recording apparatus according to claim 11, wherein the respective nozzle arrays of the inkjet head are configured in such a manner that the nozzles are arranged to be shifted from each other in the first direction in an ascending order of curing sensitivity of curable inks from an upstream side to a downstream side in the direction of the movement of the recording medium relative to the inkjet head.

13. The inkjet recording apparatus according to claim 1, wherein the inkjet head has N nozzle arrays with N≥5 of every color, which respectively discharge the thick inks and a light ink of at least one color among light inks similar in color tone to the thick inks, and a nozzle of the light ink is arranged between the two nozzles of different thick inks.

14. The inkjet recording apparatus according to claim 13, wherein the inkjet head has nozzle arrays which respectively discharge inks of a light cyan color and a light magenta color as the light inks, the nozzles in the respective nozzle arrays in the inkjet head are arranged to be shifted by P/6 from each other in the first direction, and the nozzle of the light cyan color or the nozzle of the light magenta color is arranged in between the nozzle of the cyan color and the nozzle of the magenta color, between the nozzle of the magenta color and the nozzle of the yellow color, or between the nozzle of the yellow color and the nozzle of the cyan color.

15. The inkjet recording apparatus according to claim 1, wherein the active energy imparting device imparts the active energy high enough to imperfectly cure ink droplets jetted on the recording surface of the recording medium in a single scanning action by the scanning device.

16. The inkjet recording apparatus according to claim 15, further comprising a second active energy imparting device configured to further impart active energy to the ink droplets imparted with the active energy by the active energy imparting device so as to mainly cure the ink droplets.

17. The inkjet recording apparatus according to claim 16, wherein the retention device retains the second active energy imparting device on the downstream side in the direction of the relative movement of the recording medium.

18. The inkjet recording apparatus according to claim 1, wherein the retention device retains the active energy imparting device on both sides of the inkjet head in the second direction.

19. The inkjet recording apparatus according to claim 1, wherein the inkjet head has nozzle arrays respectively discharging inks of clear and white colors, on both sides of the N color nozzle arrays in the second direction.

20. An inkjet recording method comprising:
- a retention step of disposing and retaining an inkjet head and an active energy imparting device along a second direction orthogonal to a first direction by a retention device, in which the inkjet head has nozzle arrays having nozzles each of which discharges a curable ink cured by applied active energy and which are arranged in the first direction at a pitch P, the nozzle arrays being N nozzle arrays with N≥4 of every color, which respectively discharge thick inks of at least four colors including cyan, magenta, yellow, and black, and the nozzle array being arranged to be shifted by P/N away from each other in the first direction; and the active energy imparting device imparts the active energy to ink droplets discharged from the nozzles and jetted on a recording surface of a recording medium;
- a scanning step of causing the retention device and the recording medium to relatively scan at a speed of equal to or more than 0.9 m/s in the second direction;
- a movement step of causing the retention device and the recording medium to relatively move in the first direction in every scanning action by the scanning step; and
- a control step of causing an image to be formed on the recording surface of the recording medium while causing the inkjet head and the active energy imparting device retained by the retention device to relatively scan each region of the recording medium plural times,
- wherein the curable ink includes an ink pigment and a polymerizable compound containing at least an N-vinyl lactam, the 90% diameter in cumulative volume distribution of the particle diameters of the ink pigment is equal to or less than 500 nm, and the content of N-vinyl lactam is 3% to 24%.

* * * * *